(12) United States Patent
Hara et al.

(10) Patent No.: US 8,692,756 B2
(45) Date of Patent: Apr. 8, 2014

(54) LIQUID CRYSTAL DISPLAY DEVICE AND METHOD FOR MANUFACTURING SAME

(75) Inventors: Yoshihito Hara, Osaka (JP); Yukinobu Nakata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 61 days.

(21) Appl. No.: 13/392,885

(22) PCT Filed: Apr. 28, 2010

(86) PCT No.: PCT/JP2010/057605
§ 371 (c)(1),
(2), (4) Date: Feb. 28, 2012

(87) PCT Pub. No.: WO2011/030583
PCT Pub. Date: Mar. 17, 2011

(65) Prior Publication Data
US 2012/0162055 A1    Jun. 28, 2012

(30) Foreign Application Priority Data

Sep. 8, 2009 (JP) ................................. 2009-207474

(51) Int. Cl.
*G09G 3/36*    (2006.01)
(52) U.S. Cl.
USPC ............................................................ 345/92
(58) Field of Classification Search
None
See application file for complete search history.

(56) References Cited

U.S. PATENT DOCUMENTS

| | | | |
|---|---|---|---|
| 6,256,077 B1 * | 7/2001 | Baek | 349/43 |
| 6,323,932 B1 * | 11/2001 | Zhang et al. | 349/155 |
| 6,414,730 B1 | 7/2002 | Akamatsu et al. | |
| 2007/0284627 A1 * | 12/2007 | Kimura | 257/257 |
| 2008/0137022 A1 | 6/2008 | Komeno et al. | |
| 2010/0014042 A1 | 1/2010 | Komeno et al. | |

FOREIGN PATENT DOCUMENTS

| | | |
|---|---|---|
| JP | 10-170937 A | 6/1998 |
| JP | 11-084416 A | 3/1999 |
| JP | 2000-199917 A | 7/2000 |
| JP | 2006-195098 A | 7/2006 |
| JP | 2008-145461 A | 6/2008 |

OTHER PUBLICATIONS

Official Communication issued in International Patent Application No. PCT/JP2010/057605, mailed on Aug. 10, 2010.

* cited by examiner

*Primary Examiner* — Nicholas Lee
(74) *Attorney, Agent, or Firm* — Keating & Bennett, LLP

(57) ABSTRACT

The present invention provides a liquid crystal display device and a method for manufacturing the same that can improve aperture ratio of pixels while securing necessary storage capacitance using a simple configuration even if there is progress in high resolution of pixels. The liquid crystal display device according to the present invention is provided with a plurality of pixels. A thin film transistor array substrate includes gate lines and source lines arranged in a grid pattern on a principal surface of a supporting substrate, transparent pixel electrodes, and thin film transistors. Also, the thin film transistor array substrate includes a gate insulator, a passivation layer, a transparent conductive film, a first insulation layer, and transparent pixel electrodes stacked in order from a supporting substrate side. The transparent pixel electrodes are electrically connected with drain electrodes of the thin film transistors through contact holes formed in the first insulation layer. When a substrate surface is viewed in a direction of a normal to the substrate surface, the transparent conductive film does not overlap regions in which the transparent pixel electrodes and the drain electrodes are electrically connected with each other.

15 Claims, 33 Drawing Sheets

Fig. 2
(a)
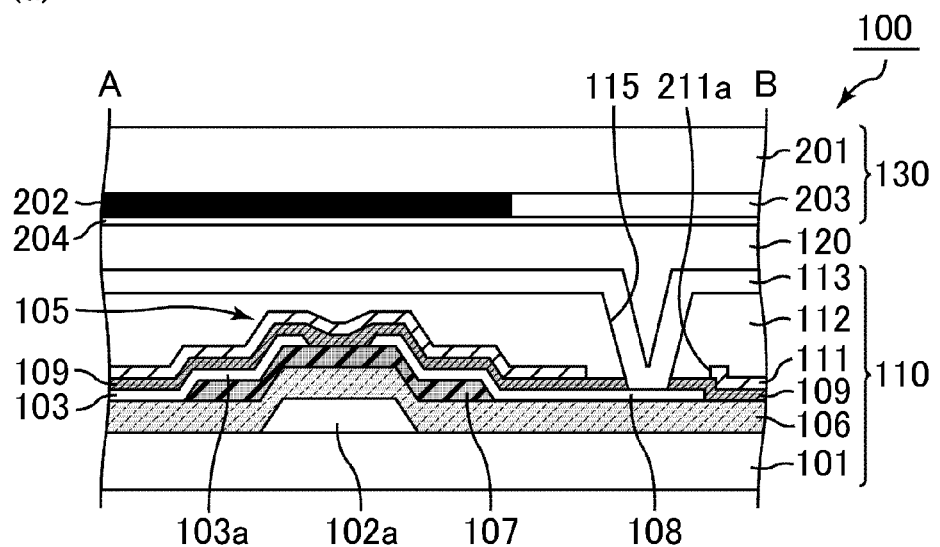
(b)
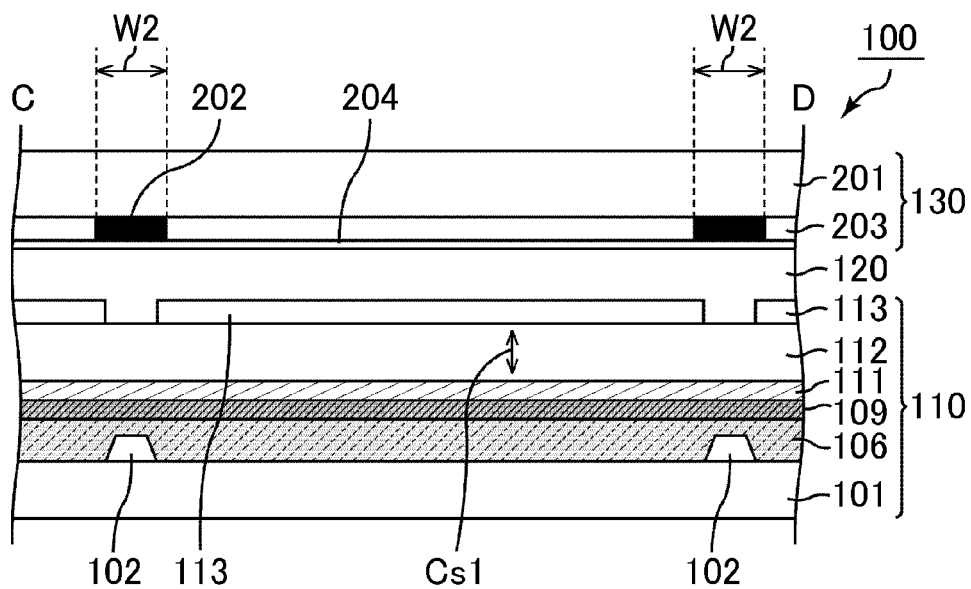

Fig. 6
(a)
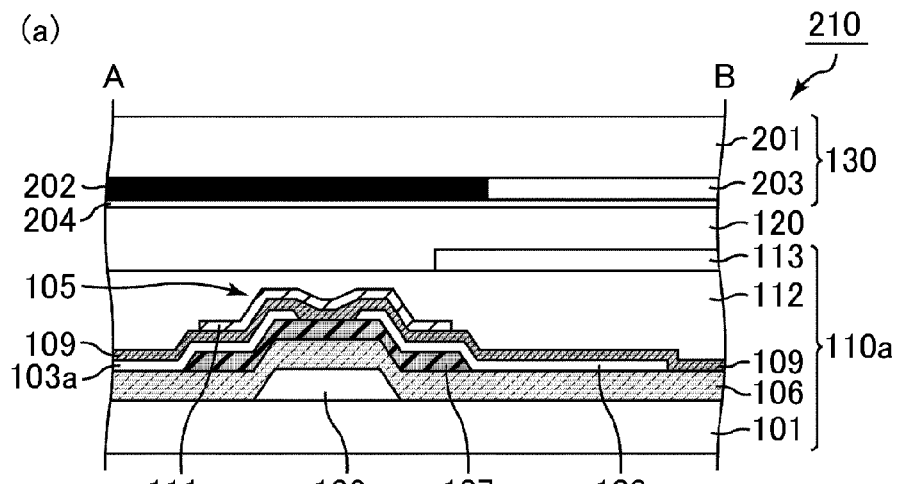
(b)
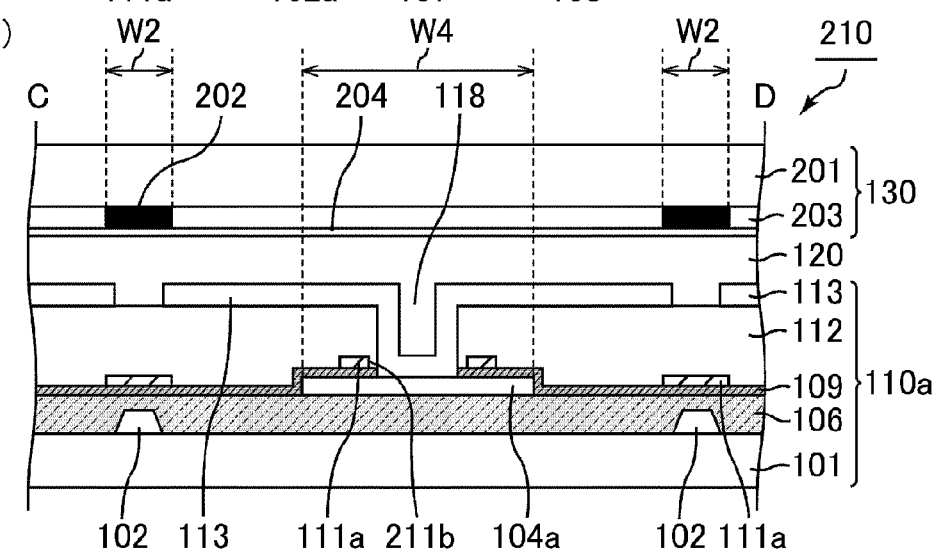
(c)
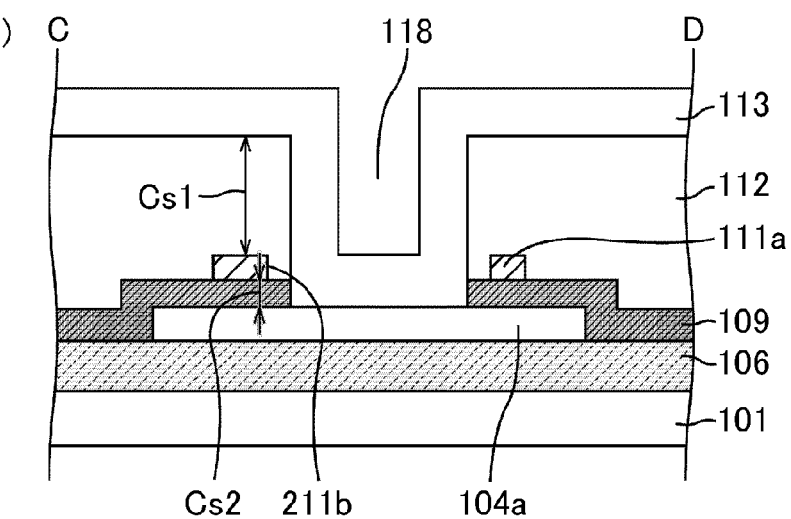

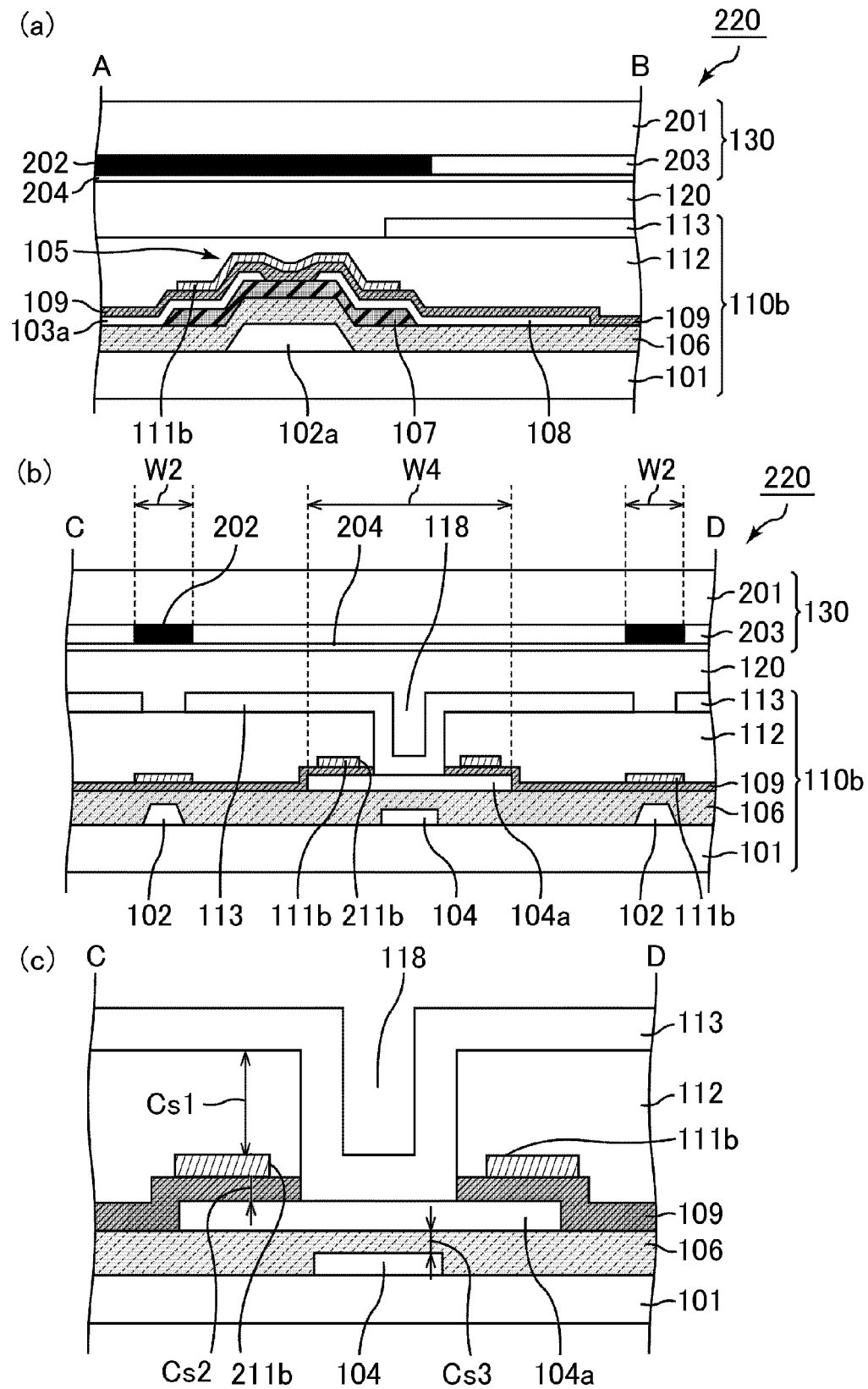

LIQUID CRYSTAL DISPLAY DEVICE AND METHOD FOR MANUFACTURING SAME

TECHNICAL FIELD

The present invention relates to a liquid crystal display device and a method for manufacturing the same. More specifically, the present invention relates to an active matrix liquid crystal display device and a method for manufacturing the same.

BACKGROUND ART

In the field of display devices such as liquid crystal display devices and organic EL displays, in response to demands for improvements in resolution and downsizing of the devices, there has been progress in high resolution of pixels. In addition to high resolution of pixels, there are also demands for higher aperture ratios of pixels. These demands are especially noticeable in relation to high definition liquid crystal display devices with a pixel pitch of 40 μm or less.

For example, Patent document 1 proposes an active matrix liquid crystal display device whose high resolution of pixels can be achieved. Active matrix liquid crystal display devices have a configuration in which a liquid crystal layer is interposed between a TFT array substrate and an opposed substrate, where TFTs (Thin Film Transistors) are mounted on the TFT array substrate.

In the liquid crystal display devices, progress in high resolution of pixels lead to increases in wiring resistance, resulting in an increased tendency toward signal delays. Thus, to eliminate signal delays, Patent document 1 proposes a technique for forming various types of wiring including gate lines, source lines, and storage capacitor wiring from low-resistance metal materials such as aluminum (Al), copper (Cu), titanium (Ti), and silver (Ag). Hereinafter wiring made of any of these metal materials will be referred to also as metal wiring.

In liquid crystal display devices, to increase the aperture ratio of pixels, i.e., the ratio of a display area to an entire display screen, it is necessary to minimize regions serving as light-shielding portions. Also, in order to align the TFT array substrate and opposed substrate precisely, preferably the light-shielding portions are minimized. The light-shielding portions are provided on pixel boundaries, partitioning the pixels, and provided, as required, so as to cover regions where TFT and display characteristics tend to degrade.

Since the metal wiring has light-shielding properties, the technique proposed in Patent document 1 reduces light-shielding portions by not forming any additional light-shielding portion in regions that can be light-shielded by the metal wiring, and thereby reduces misalignment between the TFT array substrate and opposed substrate and improves the aperture ratio.

Also, the aperture ratio of the pixels is increased by providing an interlayer insulation layer of a special configuration on the wiring formed on the TFT array substrate and placing transparent pixel electrodes on the interlayer insulation layer.

CITATION LIST

Patent Document

[Patent document 1] JP 2000-199917A

SUMMARY OF THE INVENTION

However, even the liquid crystal display device with the above configuration does not yet have a sufficient pixel aperture ratio, and there is demand for further improvements in the aperture ratio.

One of the factors that get in the way of increasing the pixel aperture ratio is that the electrodes and/or wiring used to produce storage capacitance are formed of metal material. In liquid crystal display devices, the storage capacitance is provided in parallel with liquid crystal capacitance and formed, for example, by storage capacitor electrodes and storage capacitor wiring. In order to secure necessary storage capacitance while progressing in high resolution of pixels, it is necessary to increase the areas of storage capacitor electrodes and storage capacitor wiring. However, the storage capacitor electrodes and storage capacitor wiring, which are formed of the metal material described above, act as light-shielding portions. Consequently, increases in the areas of storage capacitor electrodes and storage capacitor wiring will result in decreases in the aperture ratio of pixels.

Increases in the width of light-shielding portions along with high resolution of pixels are also one of the factors that reduce the pixel aperture ratio, where the light-shielding portions are provided on pixel boundaries and called a black matrix. Active matrix liquid crystal display devices display images by applying a voltage to the liquid crystal layer between transparent pixel electrodes formed on the TFT array substrate and common electrodes formed on the opposed substrate, but the transparent pixel electrodes are subject to a gate voltage of the TFTs, which can lower display characteristics. The lowering of the display characteristics is liable to occur especially near the pixel boundaries. Thus, the width of the black matrix is increased to prevent an impact on the display characteristics, but even such an increase in the area of the light-shielding portions will impede improvements of the pixel aperture ratio.

Furthermore, in liquid crystal display devices containing a semiconductor layer made of amorphous silicon (a-Si), it is necessary to increase the area of the light-shielding portions for the following reasons, impeding improvements of the pixel aperture ratio again. That is, a TFT includes a gate electrode connected to a gate line, a source electrode connected to a source line, and a drain electrode as well as a semiconductor layer. The semiconductor layer is made of amorphous silicon (a-Si), polysilicon, single-crystal silicon, or the like. The semiconductor layer formed of a-Si (hereinafter also referred to as an a-Si semiconductor layer) is subject to increases in off-current due to light. Consequently, light-shielding portions are provided in locations overlapping the TFTs when a substrate surface is viewed in a direction of a normal to the substrate surface, decreasing the aperture ratio of pixels.

Thus, active matrix liquid crystal display devices leave room for improvement in terms of increasing the aperture ratio of pixels while securing storage capacitance. Especially, liquid crystal display devices containing an a-Si semiconductor layer are subject to decreases in the aperture ratio as described above. Furthermore, the a-Si semiconductor layer has electron mobility as low as 0.5 cm$^2$/s·V, which tends to cause deficiency of on-current, making it difficult to increase the aperture ratio of pixels. For example, it is difficult for liquid crystal display devices containing an a-Si semiconductor layer to support high definition with a resolution higher than 300 dpi recently required of mobile devices such as cell phones and digital cameras. Liquid crystal display devices for such high-definition applications use a semiconductor layer made of polysilicon (p-Si), such as CGS (Continuous Grain Silicon), with high electron mobility.

The present invention has been made in view of the above circumstances and an object of the present invention is to provide a liquid crystal display device and a method for manufacturing the same that can improve aperture ratio of pixels using a simple configuration even if there is progress in high resolution of pixels.

DISCLOSURE OF THE INVENTION

The inventors have conducted various studies on liquid crystal display devices that can achieve high resolution of pixels and increase pixel aperture ratio, have found that one of the major factors that get in the way of increasing the aperture ratio of pixels is a black matrix, and noticed that the black matrix occupies a large proportion of a display area. Consequently, the inventors have found that if a transparent conductive film is provided between a passivation layer and a first insulation layer formed on a gate insulator, transparent pixel electrodes become less subject to electric field disturbance in layers below the transparent conductive film, allowing a display area to be increased while the width of the black matrix can be reduced, allowing the aperture ratio of pixels to be increased. Having realized that this idea can beautifully solve the above problem, the inventors have arrived at the present invention.

Thus, the present invention provides a liquid crystal display device provided with a liquid crystal layer interposed between a thin film transistor array substrate and an opposed substrate and with a plurality of pixels, wherein: the thin film transistor array substrate comprises: gate lines and source lines arranged in a grid pattern on a principal surface of a supporting substrate, transparent pixel electrodes placed on the pixels, thin film transistors formed in the vicinity of intersection points between the gate lines and source lines, and also a gate insulator, a passivation layer, a transparent conductive film, a first insulation layer, and transparent pixel electrodes stacked in order from a supporting substrate side; the transparent pixel electrodes are electrically connected with drain electrodes of the thin film transistors through contact holes formed in the first insulation layer; and when a substrate surface is viewed in a direction of a normal to the substrate surface, the transparent conductive film does not overlap regions in which the transparent pixel electrodes and the drain electrodes are electrically connected with each other.

In the present invention, the passivation layer can be formed of an inorganic material such as silicon oxide (SiOx) or silicon nitride (SiNx) by a CVD method or sputtering method, and may be not only a SiOx film or SiNx film, but also a multilayer film of a SiOx film and SiNx film capable of maintaining reliability of the thin film transistors. The first insulation layer can be made of an inorganic material such as SiOx or SiNx or an organic insulation film such as a photosensitive acrylic resin. Examples of the first insulation layer includes an interlayer insulation layer in which contact holes are formed to electrically interconnect the transparent pixel electrodes and drain electrodes.

The transparent conductive film offers the effect (hereinafter also referred to as an electric field shielding effect) of making the transparent pixel electrodes less subject to electric field disturbance in layers below the transparent conductive film. Since the transparent conductive film placed between the passivation layer and first insulation layer provides the electric field shielding effect, it is possible to expand a display area that can produce a good image display. Also, if a black matrix is provided near pixel boundaries, covering poor display regions, the expansion of the display area allows the width of the black matrix to be reduced, making it possible to increase pixel aperture ratio.

In the liquid crystal display device according to the present invention, if the transparent conductive film is located so as to overlap the transparent pixel electrodes via the first insulation layer, storage capacitance can be formed between the transparent conductive film and transparent pixel electrodes. This configuration makes it possible to eliminate storage capacitor electrodes and/or storage capacitor wiring formed of metal material or reduce the area of at least one of the storage capacitor electrodes and storage capacitor wiring, and thereby improve the pixel aperture ratio.

In the liquid crystal display device according to the present invention, if the above configuration does not provide sufficient storage capacitance, the thin film transistor array substrate may further comprise storage capacitor electrodes placed across the passivation layer from the transparent conductive film when the substrate surface is viewed in the direction of the normal. Consequently, storage capacitance can be formed between the transparent conductive film and storage capacitor electrodes using the passivation layer as a dielectric. Also, the thin film transistor array substrate may further comprise storage capacitor wiring placed across the gate insulator from the transparent conductive film when the substrate surface is viewed in the direction of the normal. This allows storage capacitance to be formed between the transparent conductive film and storage capacitor wiring using the passivation layer and gate insulator as dielectrics. Furthermore, the storage capacitor electrodes and storage capacitor wiring may face each other across the gate insulator. This allows storage capacitance to be formed also between the storage capacitor electrodes and storage capacitor wiring using gate insulator as a dielectric.

Being capable of increasing the pixel aperture as described above, the liquid crystal display device according to the present invention can suitably be applied even when a pitch of the pixels in the liquid crystal display device is 40 µm or less. Incidentally, according to the present invention, the pixel is a region having a color filter of any one of, for example, red (R), blue (B), and green (G) colors and the pixel pitch is defined by an average length of the pixels in a row or column direction, whichever corresponds to the shorter side of the pixels.

In the liquid crystal display device according to the present invention, from the perspective of keeping the storage capacitance constant, preferably a potential of the transparent conductive film is constant. Possible methods for keeping the potential of the transparent conductive film constant include a method that connects the transparent conductive film to a reference potential point (ground) and a method that connects the transparent conductive film to a common electrode provided on the opposed substrate. The common electrode is used for voltage application to the liquid crystal layer.

According to a preferred form, in the liquid crystal display device according to the present invention, the transparent conductive film has an opening only a location overlapping an area in and around an opening of the first insulation layer when the substrate surface is viewed in the direction of the normal. This configuration also increases the pixel aperture ratio.

In an example of a method for manufacturing the liquid crystal display device according to the present invention, the thin film transistor array substrate is formed using at least six photomasks, the method comprising: a first photolithography process for forming the gate lines on the principal surface of the supporting substrate of the thin film transistor array substrate using a first photomask; a second photolithography process for forming a semiconductor layer using a second photomask; a third photolithography process for forming the source lines using a third photomask; a fourth photolithography process for forming the transparent conductive film using a fourth photomask; a fifth photolithography process for forming the first insulation layer that covers the transparent conductive film using a fifth photomask; and a sixth photolithography process for forming the transparent pixel electrodes for the pixels using a sixth photomask, the pixels being partitioned by the source lines and the gate lines, wherein the method further comprises a gate insulator forming process for forming the gate insulator and a passivation layer forming process for forming the passivation layer, where the gate insulator forming process is performed between the first photolithography process and the second photolithography process and the passivation layer forming process is performed between the third photolithography process and the fourth photolithography process.

The aforementioned modes may be employed in appropriate combination as long as the combination is not beyond the scope of the present invention.

Advantageous Effects of the Invention

By simply installing a transparent conductive film between the passivation layer and the first insulation layer formed on the gate insulator, the liquid crystal display device according to the present invention can expand a region that can produce a good image display and achieve high resolution of pixels and increase pixel aperture ratio. Also, the method for manufacturing the liquid crystal display device according to the present invention can easily implement the liquid crystal display device according to the present invention.

BRIEF DESCRIPTION OF THE DRAWINGS

FIG. 1-2 is a schematic plan view showing a configuration of a transparent conductive film according to Embodiment 1.

FIG. 2(a) is a schematic sectional view taken along line A-B in FIG. 1-1 and FIG. 2(b) is a schematic sectional view taken along line C-D in FIG. 1-1.

FIG. 4-1 is a schematic sectional view of the substrate in a process of S1 shown in FIG. 3.

FIG. 4-2 is a schematic sectional view of the substrate in a process of S2 shown in FIG. 3.

FIG. 4-3 is a schematic sectional view of the substrate in a process of S3 shown in FIG. 3.

FIG. 4-4 is a schematic sectional view of the substrate in a process of S4 shown in FIG. 3.

FIG. 4-5 is a schematic sectional view of the substrate in a process of S5 shown in FIG. 3.

FIG. 4-6 is a schematic sectional view of the substrate in a process of S6 shown in FIG. 3.

FIG. 5-1 is a schematic plan view showing a pixel configuration of a liquid crystal display device according to Embodiment 2.

FIG. 5-2 is a schematic plan view showing a configuration of a transparent conductive film according to Embodiment 2.

FIG. 6(a) is a schematic sectional view taken along line A-B in FIG. 5-1, FIG. 6(b) is a schematic sectional view taken along line C-D in FIG. 5-1, and FIG. 6(c) is an enlarged schematic diagram showing part of FIG. 6(b).

FIG. 7-1 is a schematic sectional view of the substrate in the process of S1 shown in FIG. 3.

FIG. 7-2 is a schematic sectional view of the substrate in the process of S2 shown in FIG. 3.

FIG. 7-3 is a schematic sectional view of the substrate in the process of S3 shown in FIG. 3.

FIG. 7-4 is a schematic sectional view of the substrate in the process of S4 shown in FIG. 3.

FIG. 7-5 is a schematic sectional view of the substrate in the process of S5 shown in FIG. 3.

FIG. 7-6 is a schematic sectional view of the substrate in the process of S6 shown in FIG. 3.

FIG. 8-1 is a schematic plan view showing a pixel configuration of a liquid crystal display device according to Embodiment 3.

FIG. 8-2 is a schematic plan view showing a configuration of a transparent conductive film according to Embodiment 3.

FIG. 9(a) is a schematic sectional view taken along line A-B in FIG. 8-1, FIG. 9(b) is a schematic sectional view taken along line C-D in FIG. 8-1, and FIG. 9(c) is an enlarged schematic diagram showing part of FIG. 9(b).

FIG. 11-1 is a schematic sectional view of the substrate in the process of S1 shown in FIG. 3.

FIG. 11-2 is a schematic sectional view of the substrate in the process of S2 shown in FIG. 3.

FIG. 11-3 is a schematic sectional view of the substrate in the process of S3 shown in FIG. 3.

FIG. 11-4 is a schematic sectional view of the substrate in the process of S4 shown in FIG. 3.

FIG. 11-5 is a schematic sectional view of the substrate in the process of S5 shown in FIG. 3.

FIG. 11-6 is a schematic sectional view of the substrate in the process of S6 shown in FIG. 3.

MODES FOR CARRYING OUT THE INVENTION

The present invention will be mentioned in more detail in the following embodiments, but is not limited to these embodiments.

Embodiment 1

Figure 1:
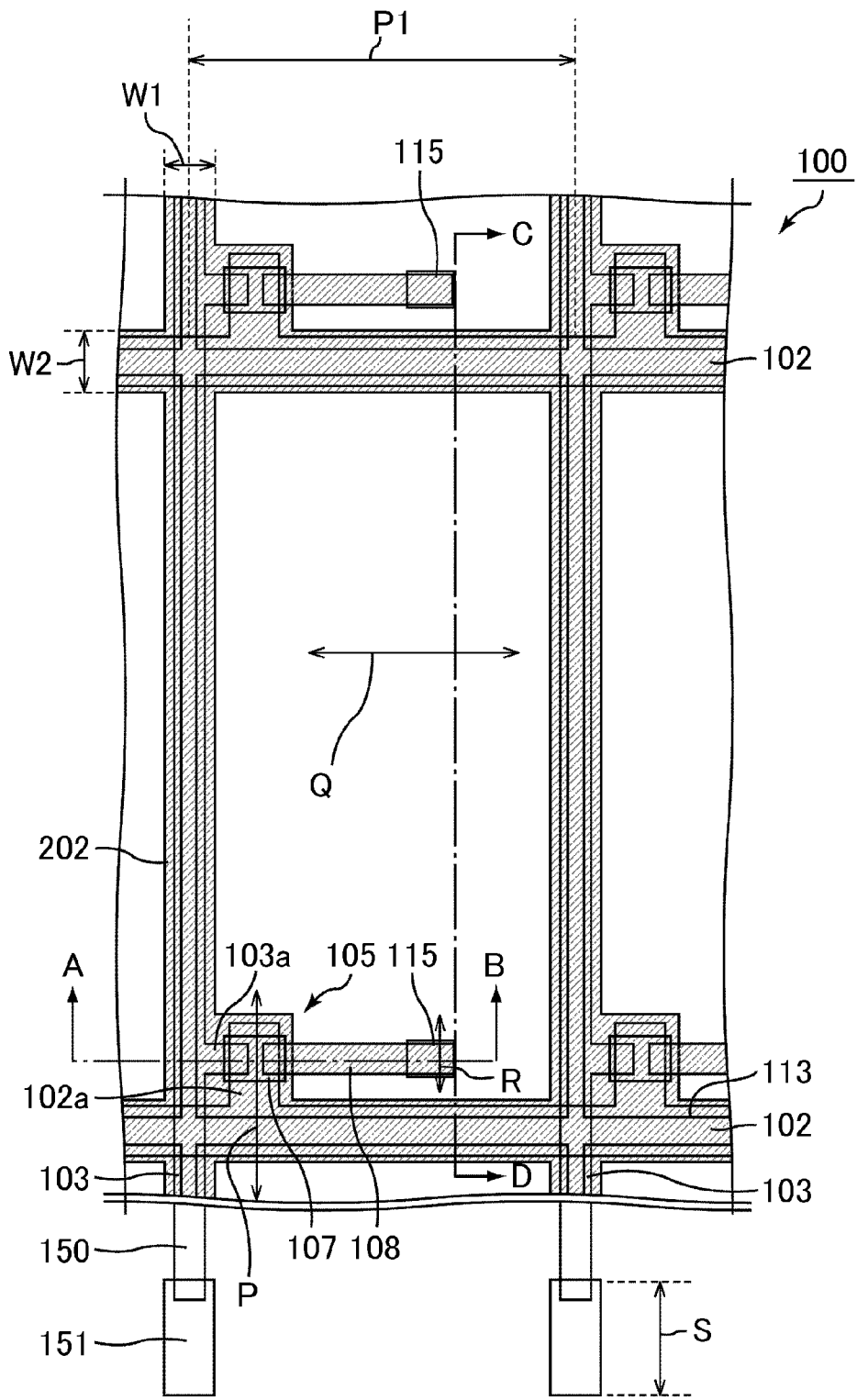
FIG. 1-1 is a schematic plan view showing a pixel configuration of a liquid crystal display device according to Embodiment 1.
Figures 1, 2:
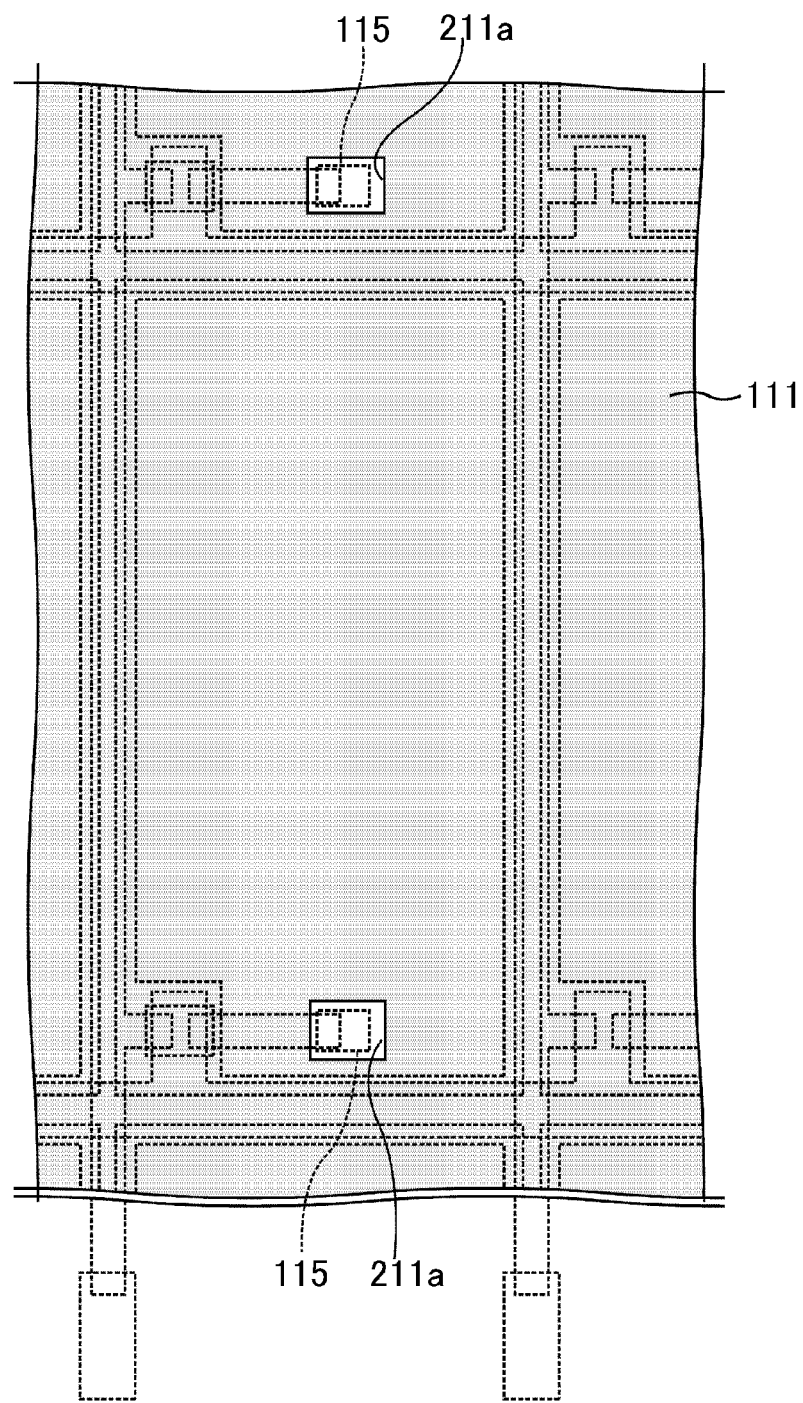

FIG. 1-1 is a schematic plan view showing a pixel configuration of a liquid crystal display device according to Embodiment 1 of the present invention and FIG. 1-2 is a schematic plan view showing a configuration of a transparent conductive film. FIG. 2(a) is a schematic sectional view taken along line A-B in FIG. 1-1 and FIG. 2(b) is a schematic sectional view taken along line C-D in FIG. 1-1.

Referring to FIGS. 1-1, 2(a), and 2(b), a liquid crystal display device 100 includes a TFT array substrate 110, a liquid crystal layer 120, and a color filter (CF) substrate 130 serving as an opposed substrate. The TFT array substrate 110 and CF substrate 130 are placed, facing each other across the liquid crystal layer 120.

Gate lines (scanning lines) 102 and source lines (signal lines) 103 are arranged in a grid pattern on a principal surface of a supporting substrate 101 of the TFT array substrate 110. The supporting substrate 101 can be a glass substrate, resin substrate, or the like. A transparent pixel electrode 113 is placed on each of pixels partitioned by the gate lines 102 and source lines 103. A TFT 105 serving as a switching element is placed near each of intersection points between the gate lines 102 and source lines 103. Also, a region S containing multiple lead wires 150 led out of the source lines 103 and terminals 151 connected to the lead wires 150 is formed on an outer fringe of a display area made up of multiple pixels.

As shown in FIGS. 2(*a*) and 2(*b*), a substrate surface on which the TFTs 105 are formed is covered by a gate insulator 106, a passivation layer 109, a transparent conductive film 111, and an interlayer insulation layer 112 in order from the side of the supporting substrate 101, where the interlayer insulation layer 112 serves as a first insulation layer. The transparent pixel electrodes 113 are formed on a principal surface of the interlayer insulation layer 112 and electrically connected with drain electrodes 108 through contact holes 115 formed in the interlayer insulation layer 112.

The gate insulator 106 is formed of an inorganic material such as SiOx or SiNx, and is about 200 nm to 500 nm in film thickness, for example.

The passivation layer 109 can be formed of an inorganic material such as SiOx or SiNx by CVD method or sputtering method, and may be not only a SiOx film or SiNx film, but also a multilayer film of a SiOx film and SiNx film.

As shown in FIG. 1-2, the transparent conductive film 111 is formed so as to cover almost an entire surface of the substrate, but openings 211*a* are formed in the transparent conductive film 111 in and around a location where the transparent conductive film 111 overlaps the contact holes 115 when a substrate surface is viewed in the direction of a normal to the substrate surface.

The transparent conductive film 111 is formed of a transparent electrode material such as ITO (Indium-Tin-Oxide), IZO (Indium-Zinc-Oxide), IDIXO (Indium Oxide Indium Zinc Oxide: $In_2O_3(ZnO)n$), or Tin Oxide ($SnO_2$), and is about 50 nm to 200 nm in film thickness. When the liquid crystal display device 100 is driven, the electric potential of the transparent conductive film 111 is 0 or constant.

The interlayer insulation layer 112 is formed, for example, of a photosensitive acrylic resin (product No. JAS-150 with a relative dielectric constant of 3.4, produced by JSR Corporation). To improve reliability, an inorganic material such as SiOx or SiNx may be used instead of photosensitive acrylic resin.

The transparent pixel electrodes 113 are formed of a transparent electrode material such as ITO or IZO, and are about 50 nm to 200 nm in film thickness.

If the region in which the TFT 105 is formed is looked at closely, on the principal surface of the supporting substrate 101, a gate electrode 102*a* linked to the gate line 102 is formed and covered by the gate insulator 106, as shown in FIG. 2(*a*).

A semiconductor layer 107 serving as a channel layer is formed on the opposite side of the gate insulator 106 from the gate electrode 102*a*. Semiconductor material of the semiconductor layer 107 is not particularly limited, and may be a-Si, p-Si, or an oxide semiconductor.

Specifically, a semiconductor layer 107 formed of a-Si has low electron mobility as described above, but a film with large area can easily be formed of a-Si because of low crystallinity, and thus the semiconductor layer 107 formed of a-Si is suitable for large liquid crystal display devices. Also, since an a-Si semiconductor layer tends to produce off-current when exposed to light, a black matrix 202 is provided in locations overlapping the TFTs 105 when the substrate surface is viewed in the direction of the normal to the substrate surface as described above. However, in the liquid crystal display device 100 according to the present embodiment, the area of the black matrix 202 provided in other regions can be reduced as described later, consequently making it possible to increase the pixel aperture ratio even though the a-Si semiconductor layer is contained in the liquid crystal display device 100.

A semiconductor layer 107 formed of p-Si has higher electron mobility and provides better TFT characteristics than the semiconductor layer 107 formed of a-Si, but a film with large area is hard to form because of high crystallinity, and thus the semiconductor layer 107 formed of p-Si is suitable for small liquid crystal display devices. Besides, a semiconductor layer 107 formed of an oxide semiconductor also has high electron mobility and provides good TFT characteristics. The film thickness of the semiconductor layer 107 is not particularly limited, and may be, for example, about 10 nm to 300 nm.

The semiconductor layer 107 is covered by a source electrode 103*a* and the drain electrode 108, the source electrode 103*a* being linked to the source line 103. The gate electrode 102*a*, gate insulator 106, semiconductor layer 107, source electrode 103*a*, and drain electrode 108 make up the TFT 105.

Preferably, the source lines 103, source electrodes 103*a*, drain electrodes 108, and gate electrodes 102*a* are metal wiring or electrodes formed of metal material described above in order to reduce resistance. These lines and electrodes may have either a single-layer structure or stacked structure and may be formed of either the same material or different materials. As an example, the source lines 103, source electrodes 103*a*, gate electrodes 102*a*, and drain electrodes 108 may be formed of a multilayer film of Ti and Al, and the film thickness of the multilayer film may be about 80 nm to 550 nm.

On the other hand, the CF substrate 130 is made up of the black matrix 202 and CF layers 203 formed on a principal surface of a supporting substrate 201 as shown in FIGS. 2(*a*) and 2(*b*). The black matrix 202 partitions the pixels by being formed in locations where the black matrix 202 overlaps pixel boundaries when the substrate surface is viewed in the direction of the normal to the substrate surface.

Also, when the semiconductor layer 107 of the TFTs 105 is formed of a-Si, leakage current is produced when the TFTs 105 are exposed to light. Thus, the black matrix 202 is formed not only on pixel boundaries as described above, but also on regions overlapping the TFTs 105 when the substrate surface is viewed in the direction of the normal to the substrate surface. The CF layer 203 has, for example, red (R), blue (B), and green (G) colors and one of the colors of the CF layer 203 is placed on each pixel.

An opposed electrode 204 about 50 nm to 200 nm in thickness is formed on that principal surface of the CF substrate 130 which is located on the side of the liquid crystal layer 120 and photo spacers (not shown) are provided in a region in which the black matrix 202 is formed.

In the liquid crystal display device 100 configured as described above, since the transparent conductive film 111 that covers almost entire surfaces of the pixels is provided between the passivation layer 109 and interlayer insulation layer 112, the transparent pixel electrodes 113 are less subject to electric field disturbance due to the gate voltage. This reduces poor display, especially poor display occurring near pixel boundaries, and thereby allows the display area to be expanded.

Conventionally poor display in the poor display regions occurring near pixel boundaries are corrected by forming the black matrix 202 in locations overlapping the poor display regions when the substrate surface is viewed in the direction of the normal to the substrate surface. Reduction of poor display regions makes it possible to reduce the area of the black matrix 202 overlapping the poor display regions and thereby further increase the pixel aperture ratio. The present embodiment can reduce width W1 of the black matrix overlapping the source lines 103 and width W2 of the black matrix overlapping the gate lines 102 when the substrate surface is viewed in the direction of the normal to the substrate surface.

Also, in the liquid crystal display device 100 according to the present embodiment, storage capacitance Cs1 can be formed between the transparent conductive film 111 and transparent pixel electrodes 113 using the interlayer insulation layer 112 as a dielectric, where the interlayer insulation layer 112 is a first insulation layer. This configuration eliminates the need for Cs wiring and Cs electrodes made of metal materials and provided in liquid crystal display devices to form storage capacitance and thereby makes it possible to increase the pixel aperture ratio while securing storage capacitance.

Furthermore, variations in parasitic capacitance formed between the source lines 103 and transparent pixel electrodes 113 can be reduced, eliminating the need to take measures against capacitive coupling of ΔCsd and thereby improving the aperture ratio.

Figure 3:
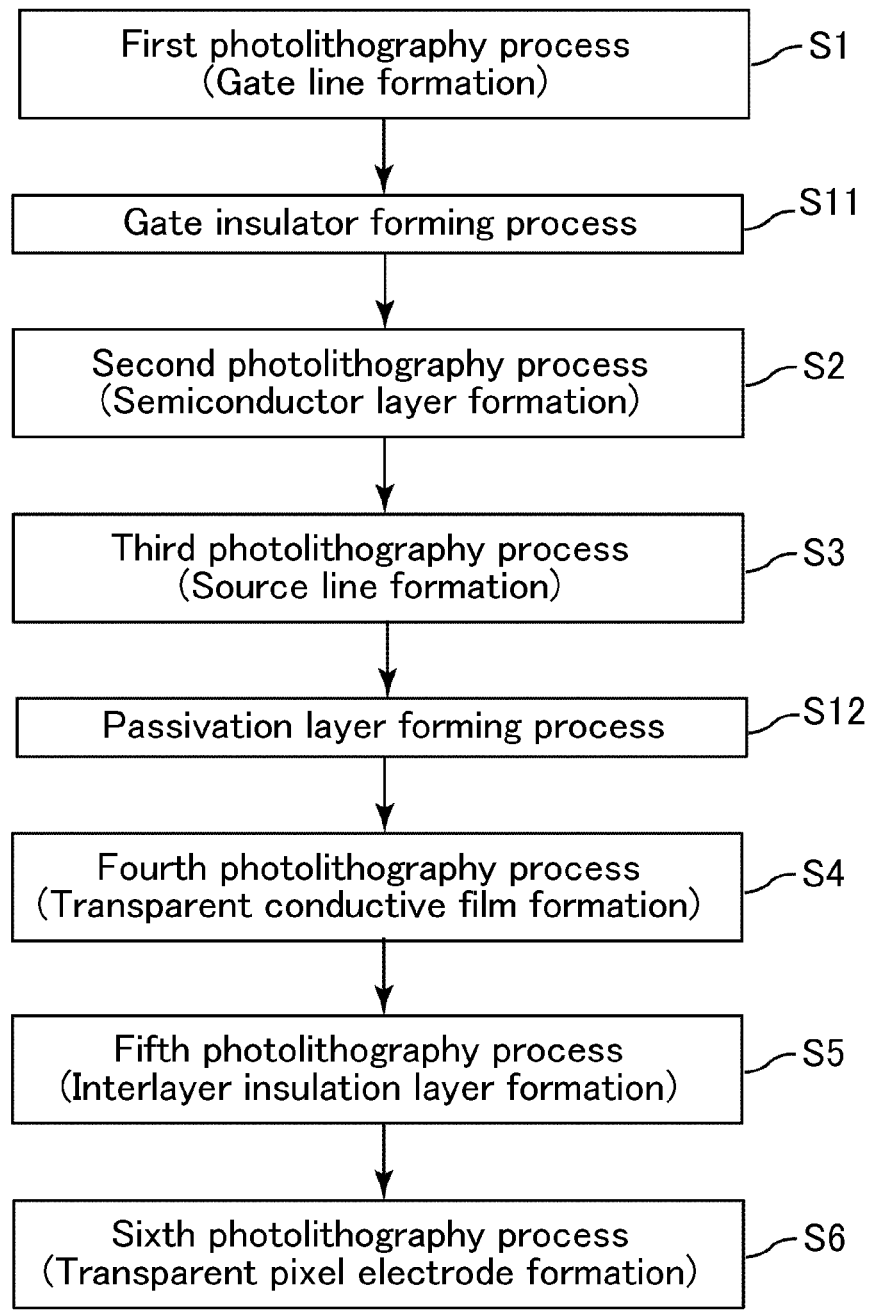
FIG. 3 is a flowchart showing manufacturing processes for a TFT array substrate according to Embodiment 1.

An example of a method for manufacturing the liquid crystal display device 100 of the above-described configuration will be described by giving a concrete example. First, manufacturing processes for the TFT array substrate 110 will be described with reference to FIGS. 3 and 4-1 to 4-6. FIG. 3 is a flowchart showing manufacturing processes for the TFT array substrate 110 according to the present embodiment. FIGS. 4-1 to 4-6 are schematic sectional views of a substrate in respective processes shown in FIG. 3. Regions P, Q, R, and S in FIGS. 4-1 to 4-6 are shown in FIG. 1-1, but a region T is not illustrated in FIG. 1-1. The region P is a TFT portion in which the TFT 105 is formed, the region Q is a Cs portion in which storage capacitance is formed, the region R is a connecting portion between the transparent conductive film 111 and drain electrode 108, the region T is a connecting portion that electrically connects, at the periphery, to the transparent conductive film 111, and the region S is a terminal portion in which a terminal 151 is formed.

As shown in FIG. 3, the TFT array substrate 110 is formed through six photolithography processes (S1 to S6) using six photomasks. Furthermore, a gate insulator forming process (S11) for forming the gate insulator 106 is included between a first photolithography process (S1) and second photolithography process (S2) while a passivation layer forming process (S12) for forming the passivation layer 109 is included between a third photolithography process (S3) and fourth photolithography process (S4).

The six photolithography processes (S1 to S6) are the first photolithography process (Step S1) for forming the gate lines using a first photomask, a second photolithography process (Step S2) for forming the semiconductor layer using a second photomask, a third photolithography process (Step S3) for forming the source lines using a third photomask, a fourth photolithography process (Step S4) for forming the transparent conductive film using a fourth photomask, a fifth photolithography process (Step S5) for forming the interlayer insulation layer using a fifth photomask and, a sixth photolithography process (Step S6) for forming the transparent pixel electrodes using a sixth photomask.

Figures 1, 4:
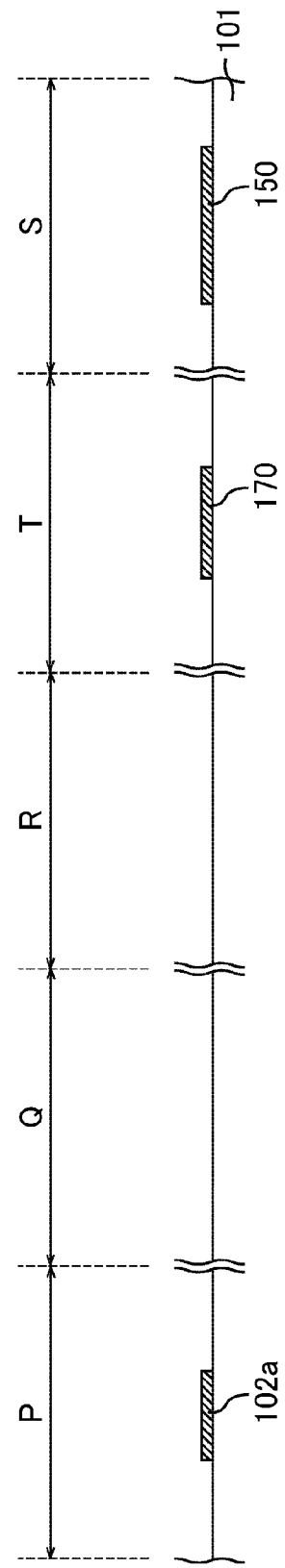
Figures 2, 4:
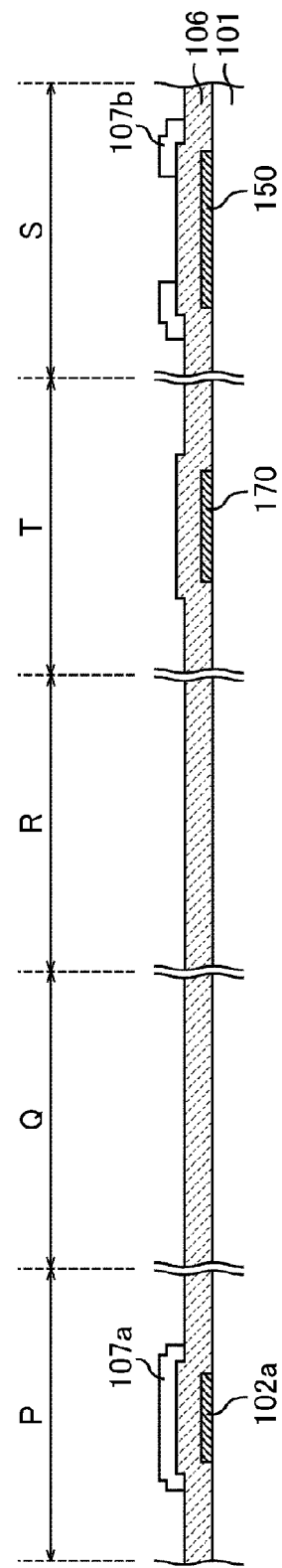
Figures 3, 4:
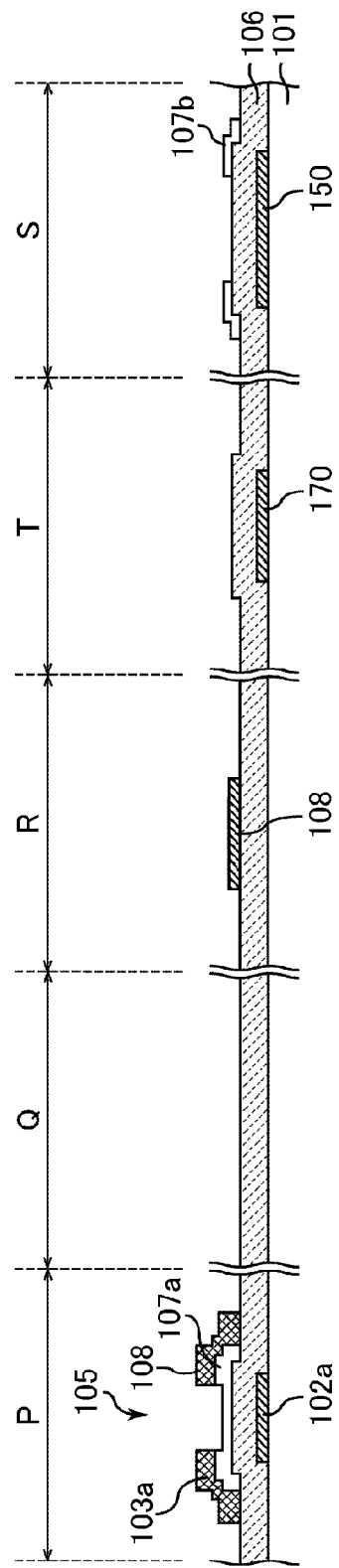
Figure 4:
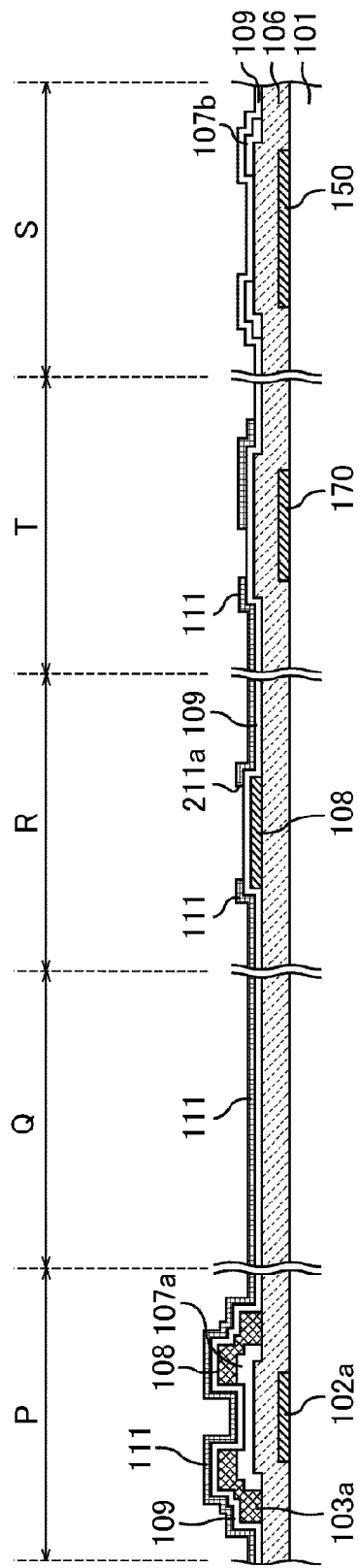

In the first photolithography process (Step S1), for example, a Ti film with a film thickness of 30 nm to 150 nm, an Al film with a film thickness of 200 nm to 500 nm, and a Ti film with a film thickness of 30 nm to 150 nm are formed in this order on the principal surface of the supporting substrate 101 by sputtering method, and the resulting multilayer film is patterned into a desired shape by a photolithography method (hereinafter referred to simply as the photolithography method) including etching and resist stripping using the first photomask. Consequently, the gate electrode 102a linked to the gate line 102 is formed in the region P, the wiring 170 is formed in the region T, and the lead wire 150 is formed in the region S as shown in FIG. 4-1.

Next, in the gate insulator forming process (S11), the gate insulator 106 is formed so as to cover the entire surface of the substrate including the gate electrodes 102a. The gate insulator 106 is obtained, for example, by depositing $SiN_2$ to a thickness of 200 nm to 500 nm by CVD method.

In the second photolithography process (S2), for example, a-Si is deposited to a thickness of 10 nm to 300 nm on the gate insulator 106 by CVD method, and the resulting a-Si layer is patterned into a desired shape by photolithography method using the second photomask. Consequently, an a-Si layer 107a is formed in the region P as shown in FIG. 4-2. Also, an a-Si layer 107b is formed in the region S.

In the third photolithography process (S3), the source electrodes 103a and drain electrodes 108 are formed on the resulting a-Si layer 107a. The source electrodes 103a and drain electrodes 108 are formed, for example, by depositing Ti to a film thickness of 30 nm to 150 nm and Al to a film thickness of 50 nm to 400 nm by sputtering method, and patterning the resulting multilayer film into a desired shape by photolithography method using the third photomask. Consequently, the source electrode 103a and drain electrode 108 are formed in the region P as shown in FIG. 4-3. The a-Si layer 107a in the region S has its film thickness reduced by etching to become the semiconductor layer 107.

Through the processes of S1 to S3 described above, the gate electrodes 102a, gate insulator 106, semiconductor layer 107, source electrodes 103a, and drain electrodes 108 are formed on the principal surface of the supporting substrate 101, making up the TFTs 105.

Next, in the passivation layer forming process (S12), the passivation layer 109 is formed so as to cover the substrate surface. The passivation layer 109 is formed, for example, by depositing $SiN_2$ to a thickness of 100 nm to 700 nm by CVD method so as to cover the entire surface of the substrate including the source lines 103 and drain electrodes 108.

Next, for example, ITO is deposited to a thickness of 50 nm to 200 nm on the passivation layer 109 to form the transparent conductive film 111 by sputtering method.

Then, in the fourth photolithography process (S4), the transparent conductive film 111 is patterned into a desired shape using the fourth photomask. Consequently, the patterned transparent conductive film 111 is formed in the regions P, Q, and R as shown in FIG. 4-4.

Next, the interlayer insulation layer 112 is formed in the regions P, Q, and R to cover the transparent conductive film 111 using a photosensitive resin.

Figures 4, 5:
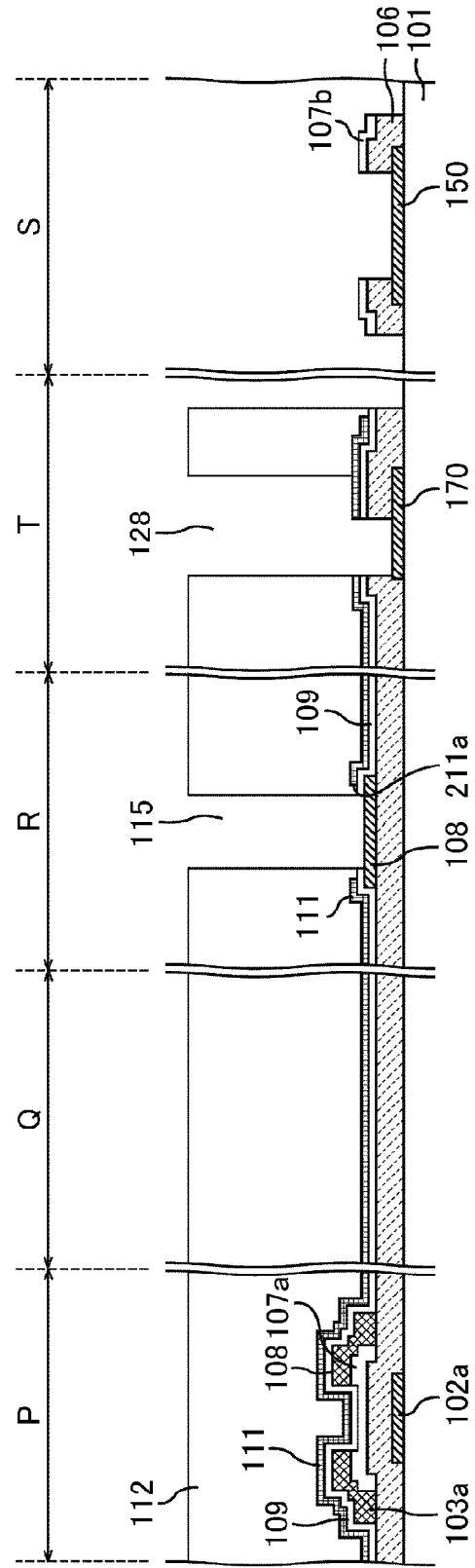

In the fifth photolithography process (S5), using the fifth photomask, the contact holes 115 and 128 are formed the interlayer insulation layer 112 in the regions R and T, respectively, and a pattern is formed in the region S. Consequently, the drain electrode 108, wiring 170, and lead wire 150 are exposed from the regions R, T, and S, respectively, as shown in FIG. 4-5.

Figures 4, 5, 6:
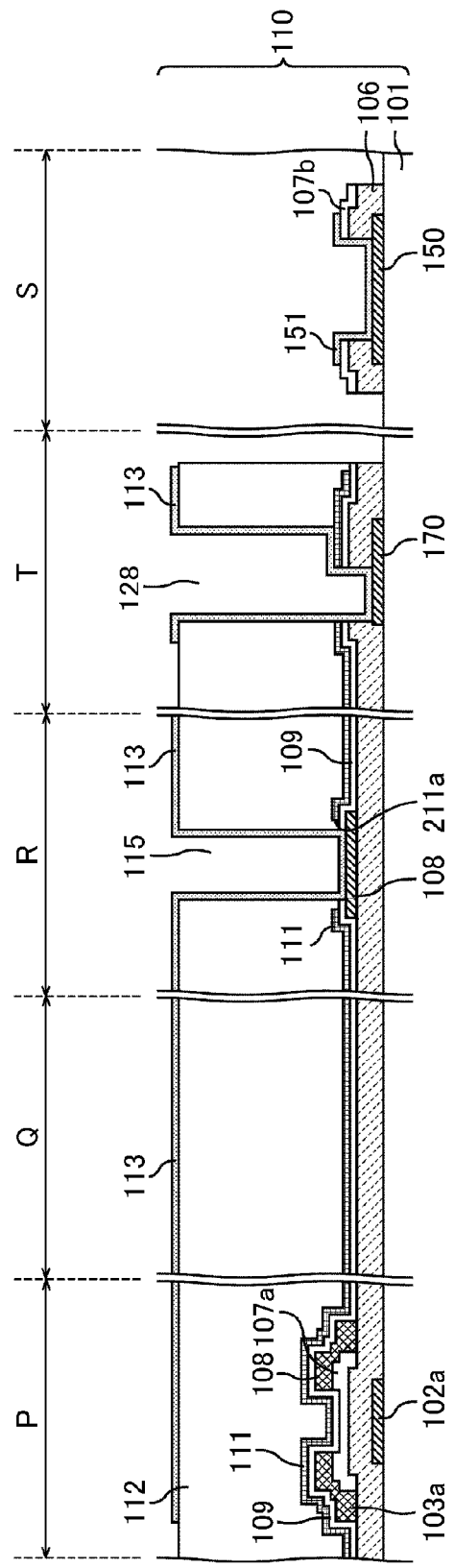
Figures 1, 5:
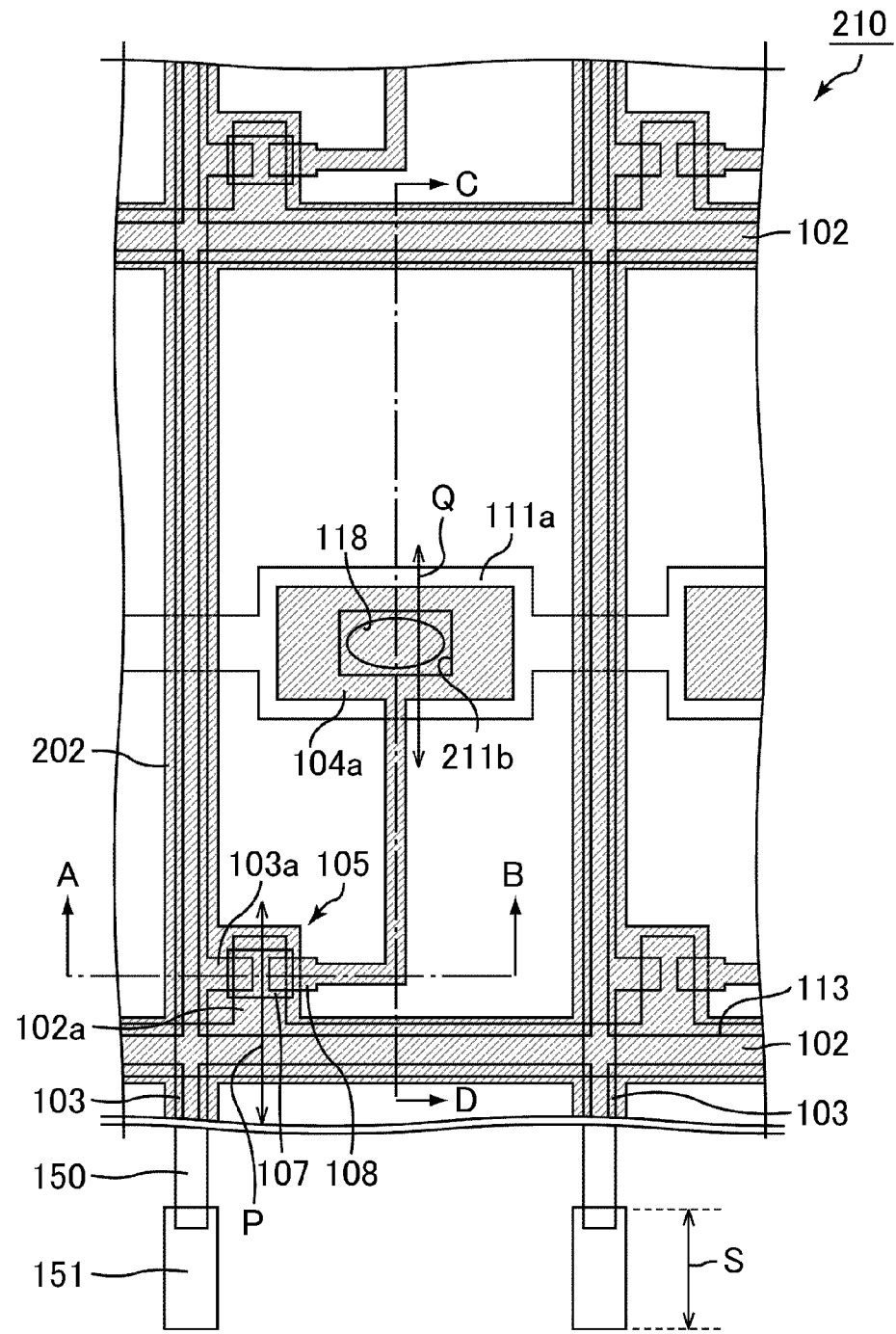
Figures 2, 5:
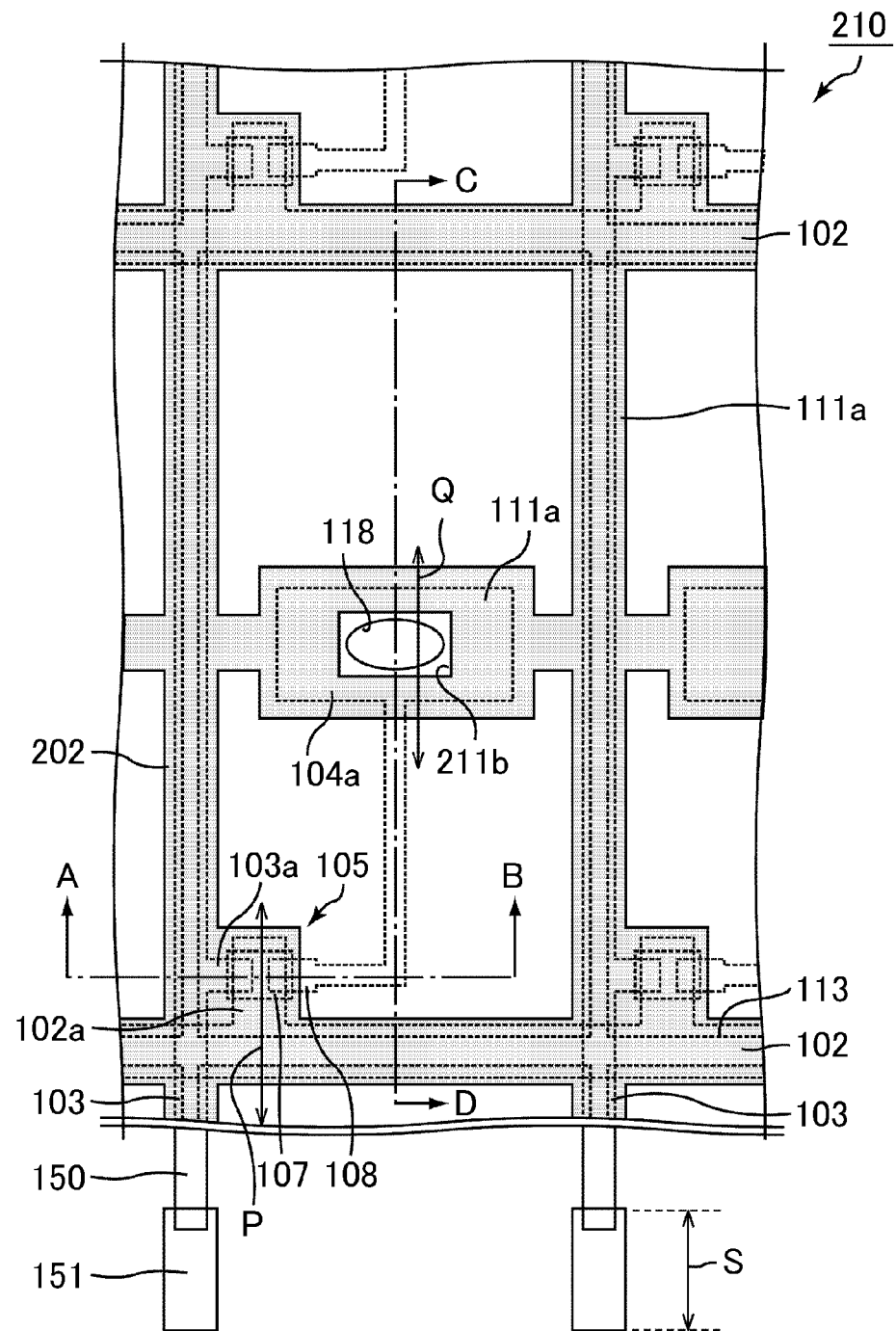

Then, for example, ITO is deposited to a thickness of 50 nm to 200 nm on the interlayer insulation layer 112, forming a thin film by sputtering method so as to cover the entire surface of the substrate. In the sixth photolithography process (S6), the thin film is patterned into a desired shape by photolithography method using the sixth photomask. Consequently, the patterned transparent pixel electrode 113 is formed in the regions P, Q, and R and the terminal 151 is formed in the region S as shown in FIG. 4-6.

In the region R, the transparent pixel electrodes 113 and drain electrodes 108 are electrically connected with each other through the contact holes 115. In the region T, the transparent conductive film 111 and wiring 170 are electrically connected with each other through the contact holes 128 using the transparent pixel electrodes 113. In the region S, the lead wire 150 and terminal 151 are connected with each other.

Through the processes of S1 to S6 described above, the TFT array substrate 110 is completed. Next, an example of a method for manufacturing the CF substrate 130 will be described.

First, the black matrix 202 is formed on the principal surface of the supporting substrate 201 by patterning a photosensitive resin containing a black pigment into a desired shape by photolithography method. Next, the CF layer 203 is formed by applying a photosensitive resin containing red (R), green (G), and blue (B) pigments to the regions partitioned by the black matrix 202. Then, the opposed electrode 204 is formed by depositing a transparent electrode material such as ITO to a thickness of 50 nm to 200 nm on the surface of the substrate by sputtering method and forming a desired pattern by photolithography method or the like. Photo spacers (not shown) are formed in the region in which the black matrix 202 is formed. The photo spacers are obtained by patterning a photosensitive resin into a desired shape by photolithography method. Through the above processes, the CF substrate 130 is completed.

A polyimide resin is applied to surfaces of the TFT array substrate 110 and CF substrate 130 produced as described above, by a printing method to form an alignment layer (not shown). The two substrates with the alignment layer formed thereon are bonded together via a sealing material, and liquid crystal is enclosed between the substrates by a dropping process, injection process, or the like. The two bonded substrates are diced, and then a drive unit, casing, light source, and other members are installed, as required, resulting in the liquid crystal display device 100 according to the present embodiment.

A concrete example of the liquid crystal display device 100 according to the present embodiment will be described below.

Example 1

The liquid crystal display device 100 according to Embodiment 1 was compared with a liquid crystal display device (a liquid crystal display device 500 according to Comparative Embodiment 1 described later) produced by a regular process of using five masks, with the pixel pitch P1 in both liquid crystal display devices set to 39 μm, and it was found that the aperture ratio was improved by 35%, even with the same pixel size.

In the present invention, the pixel aperture ratio falls slightly when the configuration of Embodiment 1 described above cannot secure sufficient storage capacitance, but storage capacitance can be secured by adding Cs wiring or Cs electrodes. A configuration in which such Cs wiring and/or Cs electrodes are provided will be described below.

Embodiment 2

In the present embodiment, an example of securing storage capacitance by adding Cs electrodes to the configuration of Embodiment 1 will be described. The same components as those of Embodiment 1 described above are denoted by the same reference numerals as the corresponding components of Embodiment 1, and description thereof will be omitted.

FIG. 5-1 is a schematic plan view showing a pixel configuration of a liquid crystal display device according to Embodiment 2 of the present invention and FIG. 5-2 is a schematic plan view showing a configuration of a transparent conductive film. FIG. 6(a) is a schematic sectional view taken along line A-B in FIG. 5-1, FIG. 6(b) is a schematic sectional view taken along line C-D in FIG. 5-1, and FIG. 6(c) is an enlarged schematic diagram showing part of FIG. 6(b).

Referring to FIG. 5-1, in a liquid crystal display device 210, the TFT 105 is located in the lower left corner of the pixel as one faces the paper. The drain electrode 108 extends from the lower left corner of the pixel to the center of the pixel. A large-area part in the center of the pixel functions as a Cs electrode 104a. In the interlayer insulation layer 112, a contact hole 118 is formed at a location overlapping the Cs electrode 104a when the substrate is viewed in the direction of the normal to the substrate surface. The transparent pixel electrode 113 and Cs electrode 104a formed on the interlayer insulation layer 112 are electrically connected with each other through the contact hole 118, and the transparent pixel electrode 113 is controlled individually and selectively by the TFT 105.

Whereas in Embodiment 1 described above, the transparent conductive film 111 is formed so as to cover the entire surface of the pixel, in the present embodiment, a transparent conductive film 111a is formed in regions that overlap a central part of the pixel, the gate lines 102, the source lines 103, and the TFT 105 when the substrate surface is viewed in the direction of the normal to the substrate surface as shown in FIGS. 5-2, 6(a), and 6(b). In the central part of the pixel, the transparent conductive film 111a is formed in parallel to the gate lines 102, intersecting the source lines 103, and a region facing the Cs electrode 104a has a wider area. Also, in the region facing the Cs electrode 104a, the contact hole 118 and a hole 211b around the contact hole 118 are formed without overlapping the region in which the transparent pixel electrode 113 and drain electrode 108 (Cs electrode 104a) are electrically connected with each other.

In the liquid crystal display device 210 configured as described above, storage capacitance for use to hold drain voltage is secured by storage capacitance Cs1 and storage capacitance Cs2. As shown in FIG. 6(c), the storage capacitance Cs1 is formed between the transparent pixel electrode 113 and transparent conductive film 111a using the interlayer insulation layer 112 as a dielectric while the storage capacitance Cs2 is formed between the transparent conductive film 111a and the Cs electrode 104a using the passivation layer 109 as a dielectric.

The shape of the transparent conductive film 111a is not particularly limited, and the area of the transparent conductive film 111a may be smaller than, equal to, or larger than the area of the Cs electrode 104a when the substrate surface is viewed in the direction of the normal to the substrate surface.

Figures 1, 7:
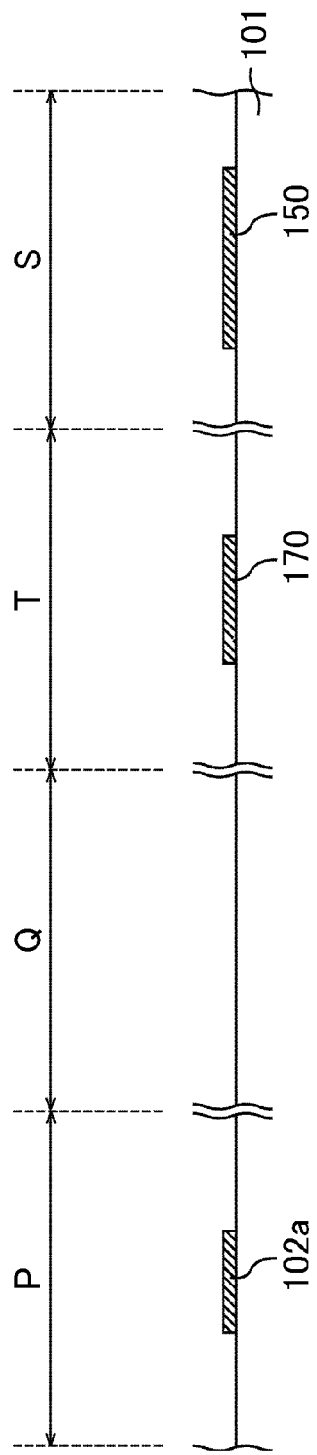
Figures 2, 7:
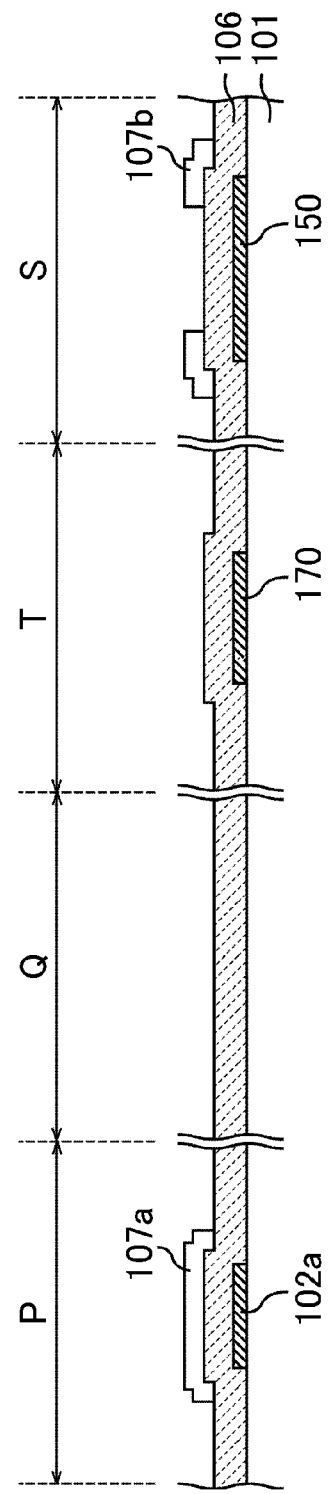
Figures 3, 7:
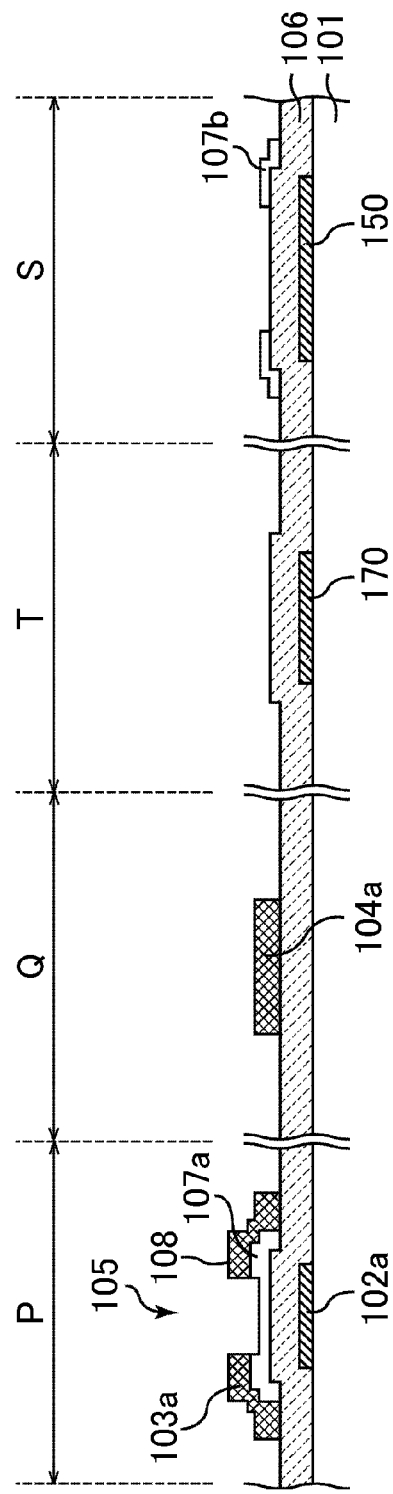
Figures 4, 7:
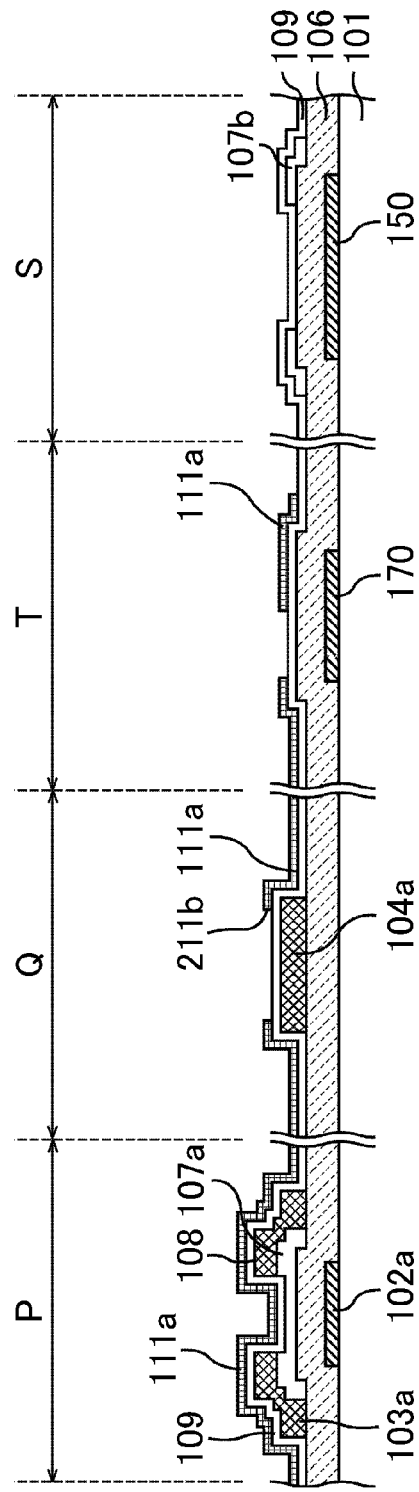
Figures 5, 7:
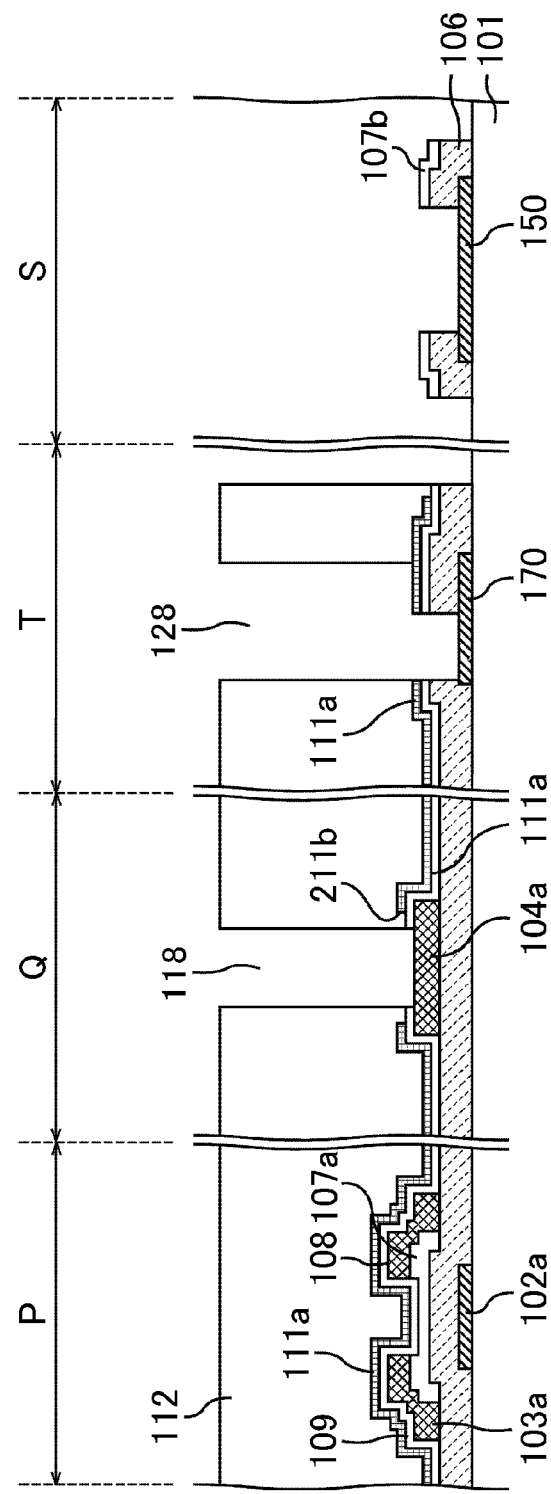
Figures 6, 7:
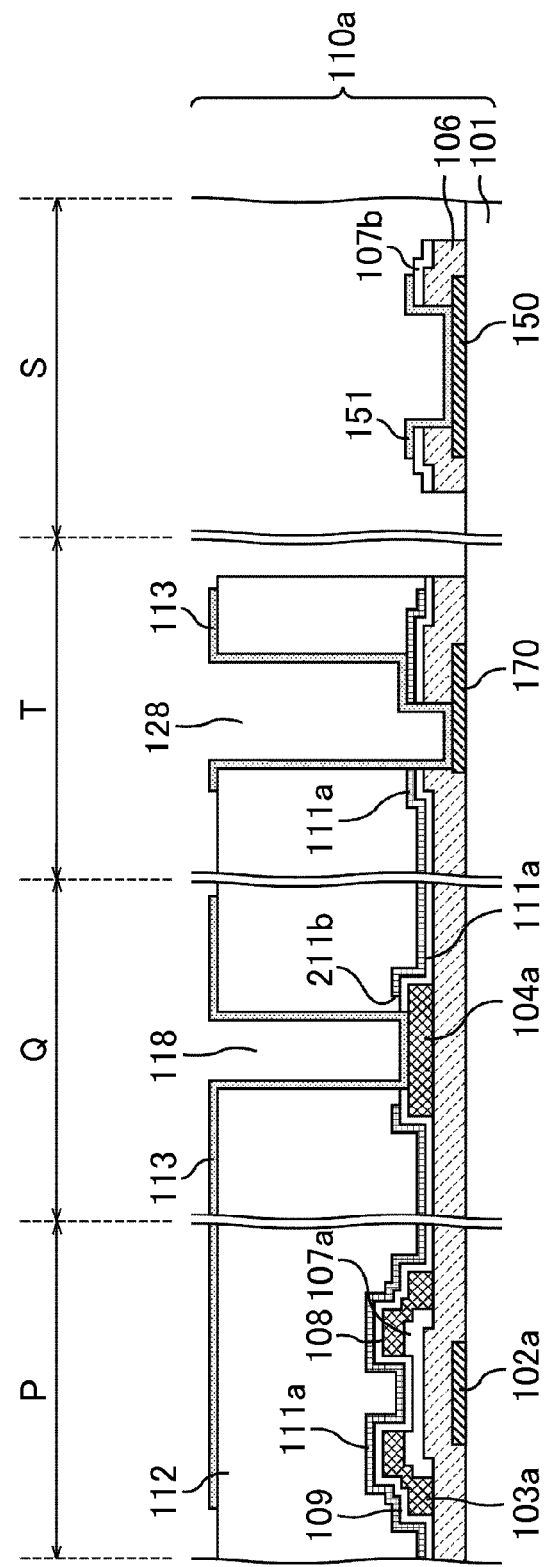

A method for manufacturing the liquid crystal display device 210 according to the present embodiment will be described below. Components other than a TFT array substrate 110a are the same as Embodiment 1 described above, and thus only a method for manufacturing the TFT array substrate 110a will be described here. FIGS. 7-1 to 7-6 are schematic sectional views for illustrating manufacturing processes for the TFT array substrate 110a according to the present embodiment. According to the present embodiment, the TFT array substrate 110a is manufactured by the same processes as Embodiment 1 described above, but photomask patterns of different shapes are used.

In FIGS. 7-1 to 7-6, configurations of regions P, S, and T are the same as in FIGS. 4-1 to 4-6 in Embodiment 1 described above, but differs in that the Cs electrode 104a is placed in the region Q. Also, the region R is included in the region Q.

Specifically, as shown in FIG. 7-1, the gate electrodes 102a, wiring 170, and lead wires 150 are formed on the substrate that has undergone the first and second photolithography processes (S1 and S2) as in the case of Embodiment 1 described above. Then, the gate insulator forming process (S11) and second photolithography process (S2) are performed as with Embodiment 1 described above, resulting in a substrate in the condition shown in FIG. 7-2. Then, the third photolithography process (S3) is performed as with Embodiment 1 described above, forming the source electrodes 103a and drain electrodes 108, producing the TFTs 105, and forming the Cs electrodes 104a in the region Q, as shown in FIG. 7-3.

Next, the passivation layer forming process (S12) and fourth photolithography process (S4) are performed as with Embodiment 1 described above to form the passivation layer 109 and patterned transparent conductive film 111. Consequently, as shown in FIG. 7-4, the patterned transparent conductive film 111a is formed in the regions P, Q, and R and the hole 211b is formed in a central part of the transparent conductive film 111a.

Next, the interlayer insulation layer 112 is formed as with Embodiment 1 described above, and then the fifth photolithography process (S5) is performed. Consequently, as shown in FIG. 7-5, the contact hole 118 is formed in the region Q and the contact hole 128 is formed in the region T.

Then, a thin film is formed so as to cover the entire surface of the substrate by depositing ITO and the sixth photolithography process (S6) is performed. Consequently, as shown in FIG. 7-6, in the region Q, the transparent pixel electrode 113 and Cs electrode 104a become electrically continuous with each other through the contact hole 118; in the region T, the transparent conductive film 111a and wiring 170 become electrically continuous with each other via the transparent pixel electrode 113 and through the contact hole 128; and in the region S, lead wire 150 and terminal 151 become electrically continuous with each other.

Embodiment 3

In the present embodiment, an example of securing storage capacitance by adding Cs wiring to the configuration of Embodiment 2 will be described. The same components as those of Embodiments 1 and 2 described above are denoted by the same reference numerals as the corresponding components of Embodiment 1 and 2, and description thereof will be omitted.

Figures 1, 8:
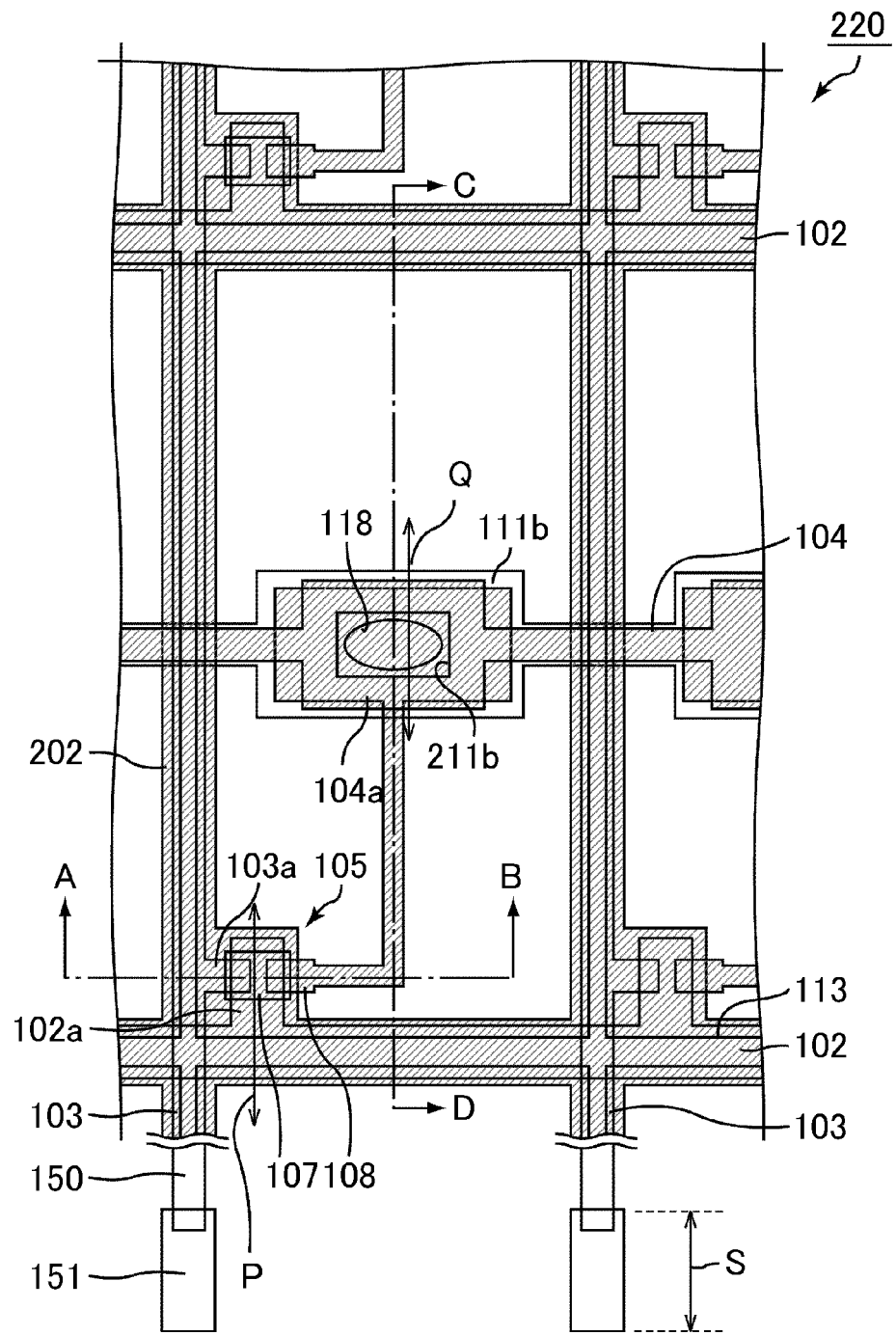
Figures 2, 8:
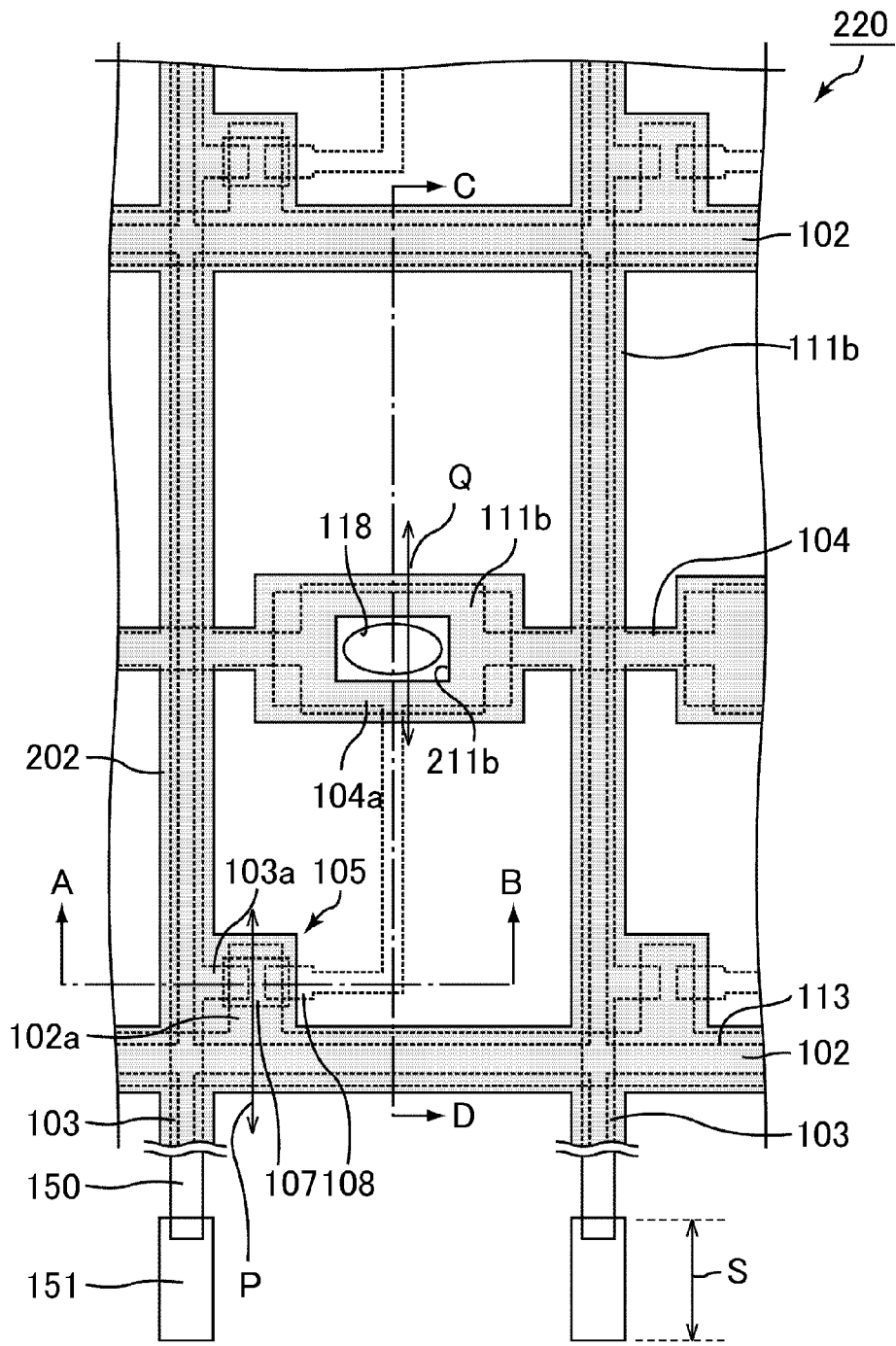

FIG. 8-1 is a schematic plan view showing a pixel configuration of a liquid crystal display device according to Embodiment 3 of the present invention and FIG. 8-2 is a schematic plan view showing a configuration of a transparent conductive film. FIG. 9(a) is a schematic sectional view taken along line A-B in FIG. 8-1, FIG. 9(b) is a schematic sectional view taken along line C-D in FIG. 8-1, and FIG. 9(c) is an enlarged schematic diagram showing part of FIG. 9(b).

In addition to the configuration of the liquid crystal display device 210 according to Embodiment 2 described above, a liquid crystal display device 220 shown in FIGS. 8-1 and 9(a) to 9(c) includes Cs wiring 104 between adjacent gate lines 102, where the Cs wiring 104 is formed, perpendicularly intersecting the source lines 113. The pixels in the same row use common Cs wiring 104. The Cs wiring 104 is placed in the same layer as the gate lines 102. Transparent conductive film 111b has substantially the same configuration as the transparent conductive film 111a according to Embodiment 2 described above, and is formed so as to overlap part of the Cs wiring 104.

As shown in FIG. 9(c), in the liquid crystal display device 220 configured as described above, the storage capacitance for use to hold drain voltage is secured by storage capacitance Cs3 formed between the Cs electrode 104a and Cs wiring 104 using the gate insulator 106 as a dielectric in addition to the storage capacitance Cs1 and storage capacitance Cs2 described above.

Figure 10:
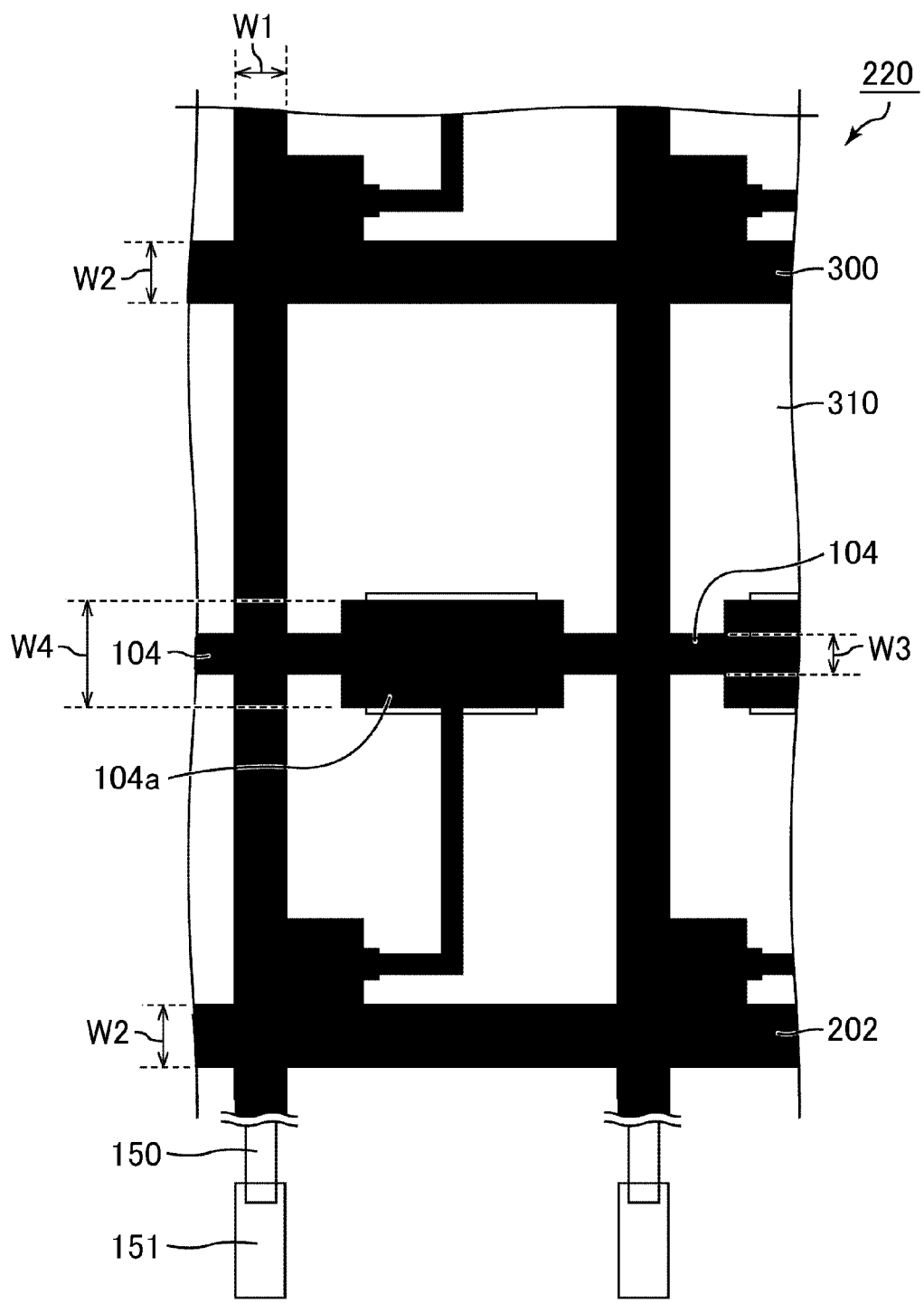
FIG. 10 is a schematic plan view showing a display area and non-display area of the pixel shown in FIG. 8-1.

FIG. 10 is a schematic plan view showing a display area and non-display area of the pixel shown in FIG. 8-1. In FIG. 10, black part corresponds to a non-display area 300 and part not marked black corresponds to a display area 310. Specifically, the non-display area 300 is an area that is not displayed by being shielded from light by a black matrix, wiring made of metal material, and the like.

When compared to the pixels of the liquid crystal display device 500 according to Comparative Embodiment 1 described later with reference to FIG. 15, a width W3 of the Cs wiring 104, widths W1 and W2 of the black matrix 202, and a width W4 of the Cs electrode 104a are much thinner. Thus, although the liquid crystal display device 220 according to the present embodiment has a lower pixel aperture ratio than the liquid crystal display device 100 according to Embodiment 1 described above, the liquid crystal display device 220 has a considerably higher pixel aperture ratio than the liquid crystal display device 500 according to Comparative Embodiment 1.

Note that although in the example described above, the Cs electrodes 104a are provided in a layer above the Cs wiring 104, the present invention is not limited to this, and the Cs wiring 104 may be provided in a layer above the Cs electrodes 104a.

Figures 1, 11:
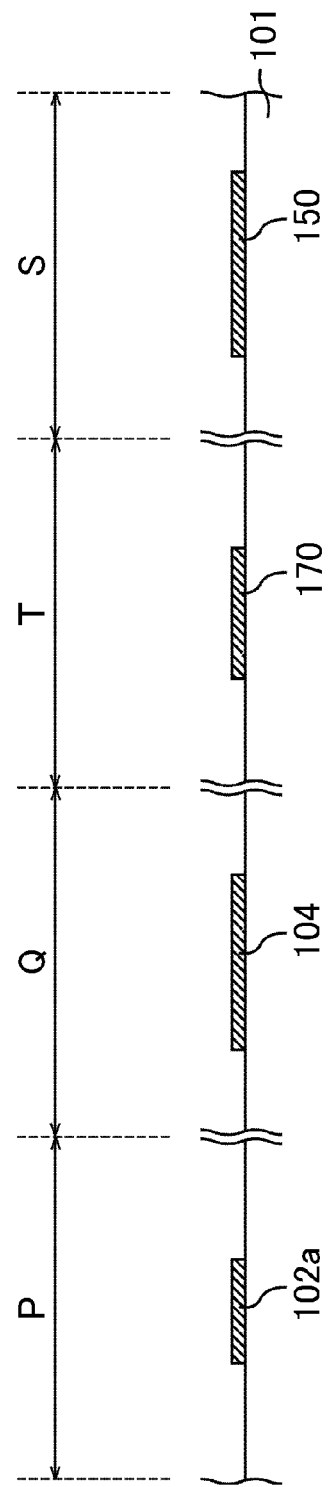
Figures 2, 11:
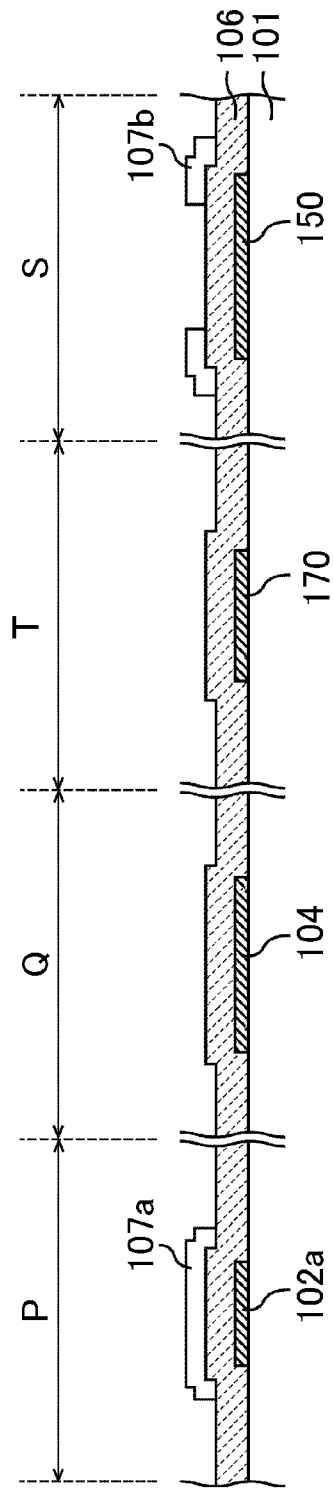
Figures 3, 11:
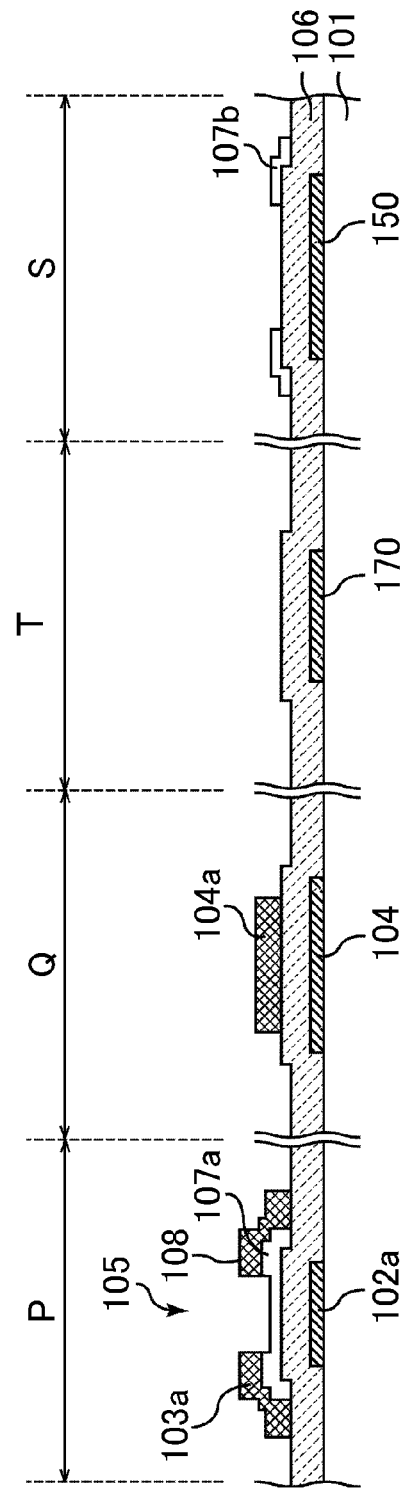
Figures 4, 11:
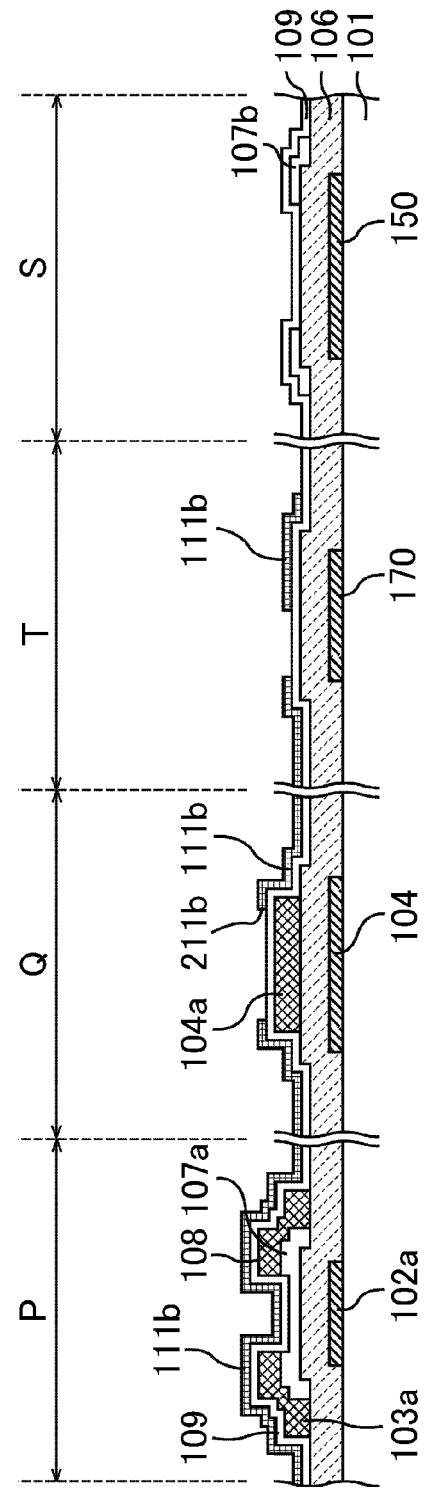
Figures 5, 11:
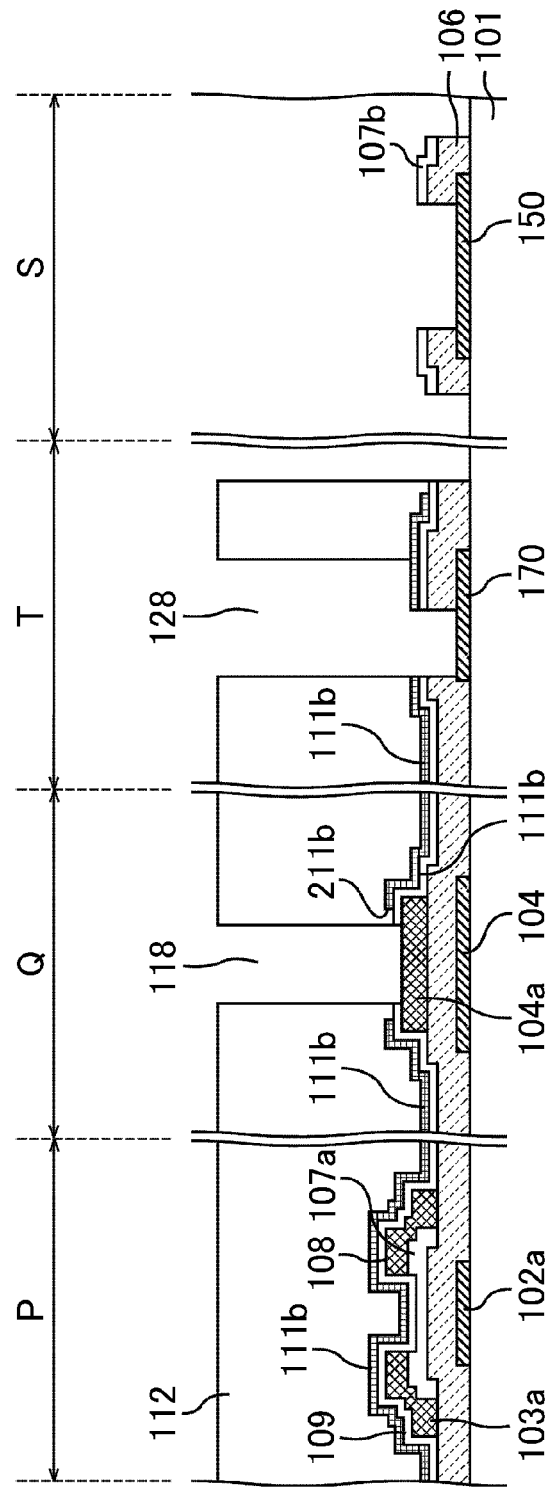
Figures 6, 11:
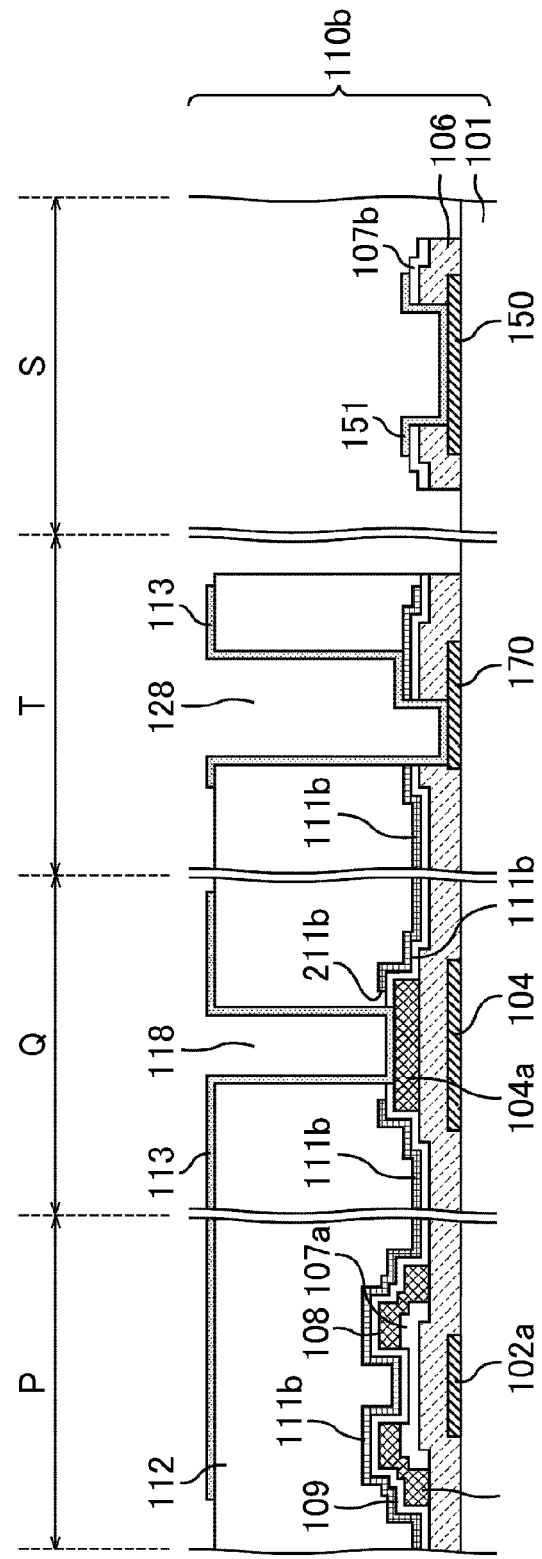

A method for manufacturing the liquid crystal display device 220 according to the present embodiment will be described below. Components other than a TFT array substrate 110b are the same as Embodiment 2 described above, and thus only a method for manufacturing the TFT array substrate 110b will be described. FIGS. 11-1 to 11-6 are schematic sectional views for illustrating manufacturing processes for the TFT array substrate 110b according to the present embodiment. According to the present embodiment, the TFT array substrate 110b is manufactured by the same processes as Embodiments 1 and 2 described above, but photomask patterns of different shapes are used.

In FIGS. 11-1 to 11-6, configurations of regions P, T, and S are the same as in FIGS. 7-1 to 7-6 in Embodiment 2 described above, but differs in that the Cs wiring 104 is formed additionally in the region Q. That is, as shown in FIG. 11-1, on the substrate that has undergone the first photolithography process (S1) according to Embodiment 2 described above, the Cs wiring 104 is formed in the region Q.

Next, the gate insulator 106 is formed in the same manner as described above so as to cover the substrate surface including the Cs wiring 104, and then the a-Si layer 107a and a-Si layer 107b are formed as shown in FIG. 11-2 in the second photolithography process (S2).

Then, the third photolithography process (S3) is performed in the same manner as described above, thereby forming the source electrodes 103a and drain electrodes 108. Also, the Cs electrode 104a is formed in the region Q.

Next, the passivation layer 109 and transparent conductive film 111 are formed as with Embodiment 2 described above and the fourth photolithography process (S4) is performed. Consequently, as shown in FIG. 11-4, the patterned transparent conductive film 111b and hole 211b are formed in the regions P, Q, and R.

Next, the interlayer insulation layer 112 is formed as with Embodiment 2 described above, and then the fifth photolithography process (S5) is performed. Consequently, as shown in FIG. 11-5, the contact hole 118 is formed in the region Q.

Then, a thin film is formed so as to cover the entire surface of the substrate by depositing ITO and the sixth photolithography process (S6) is performed. Consequently, as shown in FIG. 11-6, in the region Q, the transparent pixel electrode 113 and Cs electrodes 104a become electrically continuous with each other through the contact hole 118; and in the region S, lead wire 150 and terminal 151 become electrically continuous with each other. Consequently, the TFT array substrate 110b according to the present embodiment is completed.

As described above, according to the present embodiment, the formation of the transparent conductive film 111b between the passivation layer 109 and interlayer insulation layer 112 results in not only the formation of the storage capacitance Cs3 between the Cs wiring 104 and Cs electrodes 104a, but also the formation of the storage capacitance Cs2 between the transparent conductive film 111a and Cs wiring 104 and the formation of the storage capacitance Cs1 between the transparent conductive film 111a and transparent pixel electrode 113Cs. Thus, even though high resolution of pixels is achieved, the pixel aperture ratio can be increased by reducing the area of the Cs wiring 104.

Although in Embodiment 1 described above, the transparent conductive film 111 is formed on the entire surface of the substrate and in Embodiments 2 and 3, the transparent conductive film 111a or 111b is formed in the central part of the pixel, regions that partition the pixels (regions that overlap gate lines 102 or source lines 103), and regions that overlap the TFTs 105, the shape of the transparent conductive film according to the present invention is not limited to this, and the transparent conductive film may be formed, for example, only in the central part of the pixel. In that case, although the shielding effect described above is reduced, sufficient storage capacitance Cs can be ensured while the pixel aperture ratio is maintained.

Figure 12:
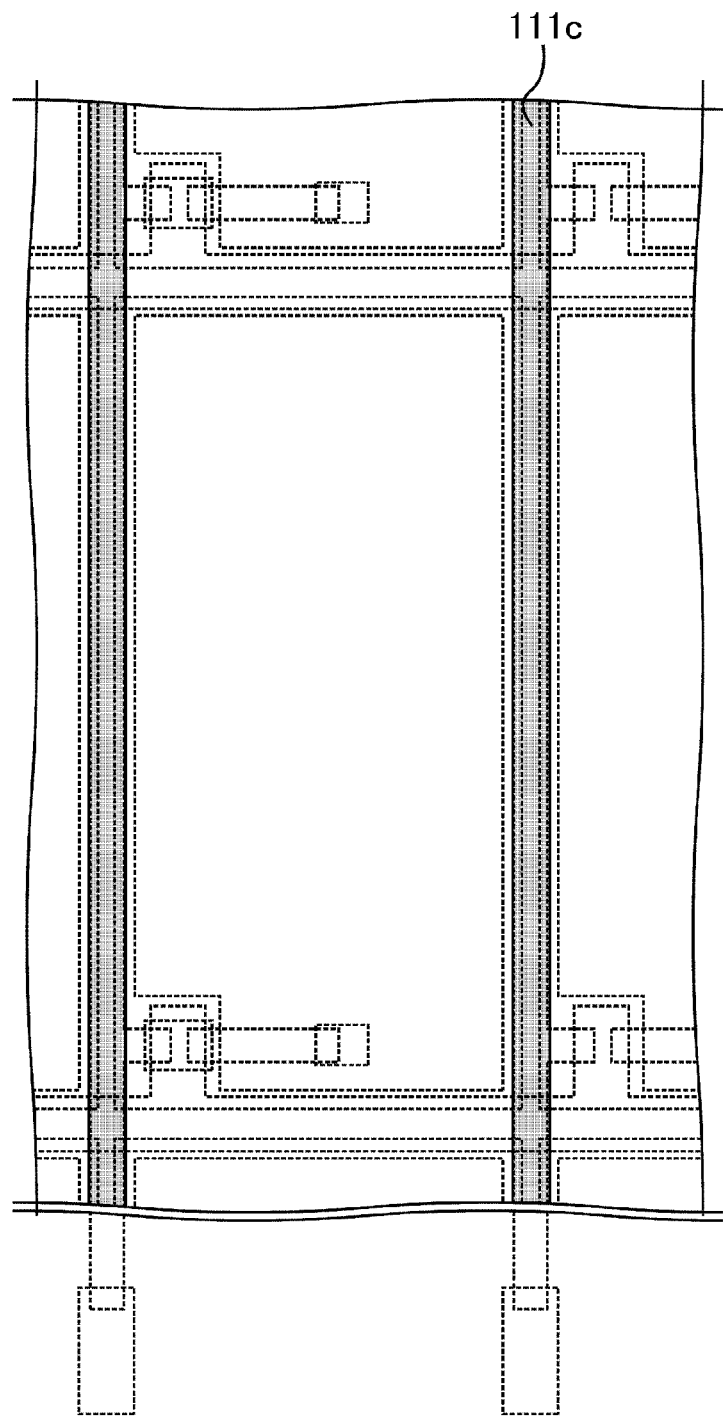
FIG. 12 is a schematic plan view showing another form of the transparent conductive film of the liquid crystal display device according to the present invention.

Alternatively, the transparent conductive film may be formed only in regions overlapping the regions that partition the pixels when the substrate surface is viewed in the direction of the normal to the substrate surface. FIG. 12 is a schematic plan view showing another form of the transparent conductive film of the liquid crystal display device according to the present invention. In FIG. 12, a transparent conductive film 111c is formed only in locations overlapping the source lines 103 when the substrate surface is viewed in the direction of the normal to the substrate surface. In this way, by forming the transparent conductive film 111c in a stripe pattern, it is possible to eliminate signal delays due to increases in the load capacitance of the source lines 103 while maintaining the electric field shielding effect which makes the transparent pixel electrodes 113 less subject to electric field disturbance due to the gate voltage.

Note that although in the examples described in the above embodiments, the width W1 of the Cs wiring 104 is reduced to improve the pixel aperture ratio, the present invention is not limited to this, and the aperture ratio may be improved by reducing the width W2 of the Cs electrodes 104a or widths of both the Cs wiring 104 and Cs electrodes 104a.

Also, although in the examples described in the above embodiments, the black matrix 202 and CF layer 203 are provided on the side of the CF substrate 130, the present invention is not limited to this, and these members may be formed on the side of the TFT array substrate.

Also, although liquid crystal display devices equipped with bottom gate TFTs have been described as an example in the above embodiments, the present invention is not limited to this, and may be applied to liquid crystal display devices equipped with top gate TFTs. Furthermore, it is sufficient if storage capacitance is formed at least between the transparent conductive film 111 or 111a and transparent pixel electrodes 113. Other locations of storage capacitance are not particularly limited, and may be selected as required.

Comparative Embodiment 1

Figure 13:
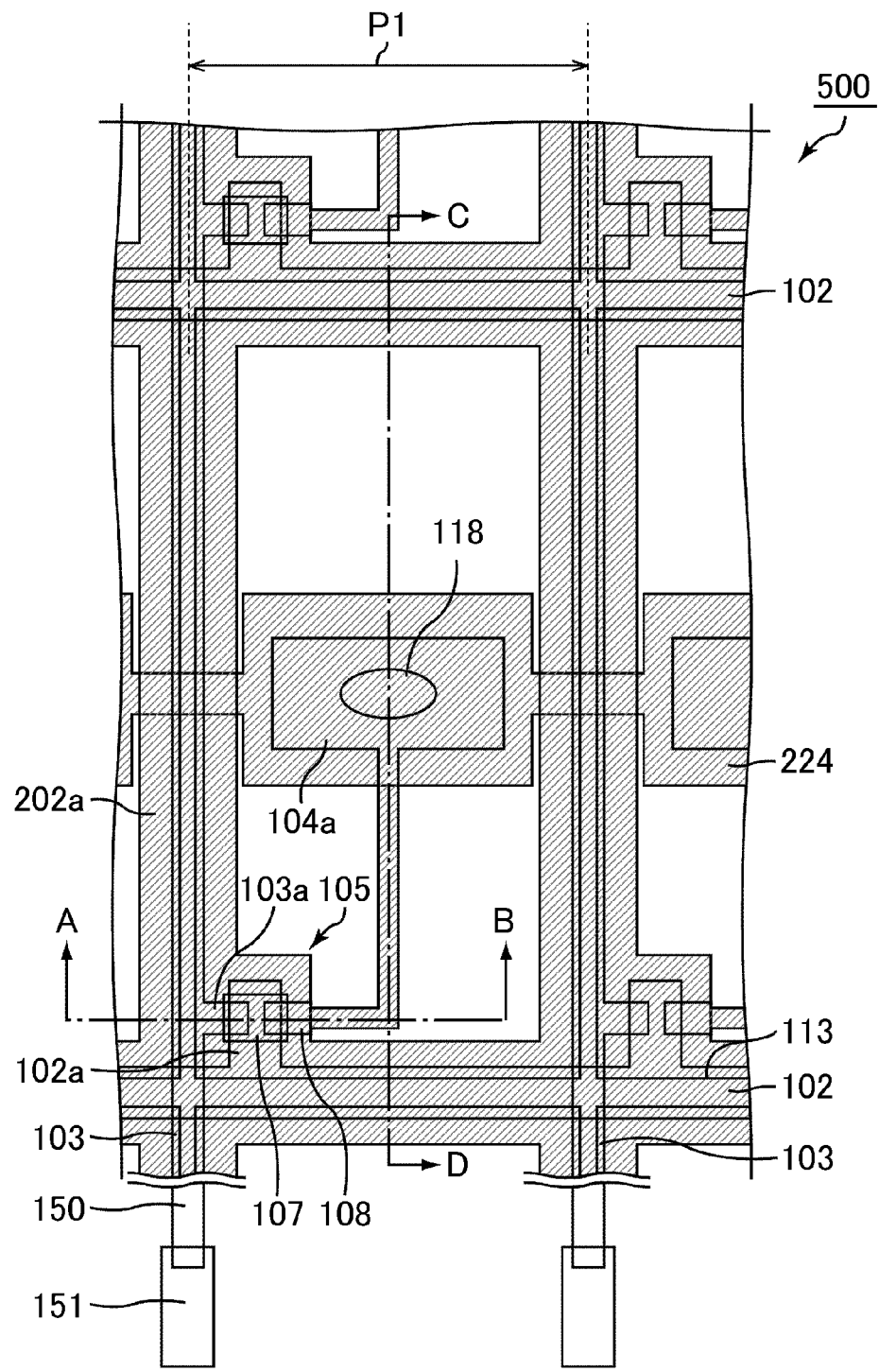
FIG. 13 is a schematic plan view showing a pixel configuration of a liquid crystal display device according to Comparative Embodiment 1.
Figure 14:
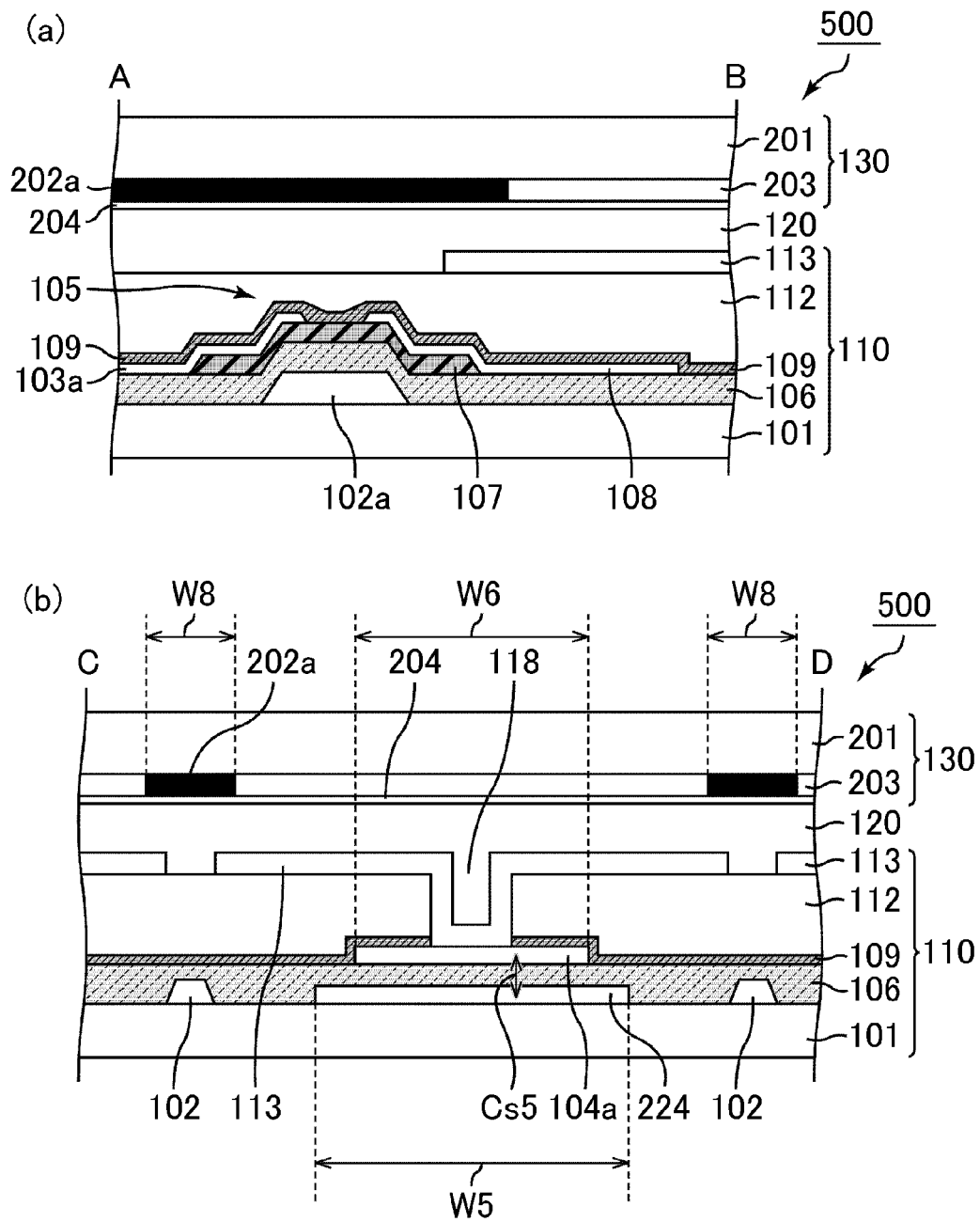
FIG. 14(a) is a schematic sectional view taken along line A-B in FIG. 13
FIG. 14(b) is a schematic sectional view taken along line C-D in FIG. 13.

FIG. 13 is a schematic plan view showing a pixel configuration of a liquid crystal display device according to Comparative Embodiment 1. FIG. 14(a) is a schematic sectional view taken along line A-B in FIG. 13 and FIG. 14(b) is a schematic sectional view taken along line C-D in FIG. 13. FIG. 15 is a schematic plan view showing a display area and non-display area of the pixel shown in FIG. 13. In FIGS. 13 to 15, components similar to those of the embodiments described above are denoted by the same reference numerals as the corresponding components, and description thereof will be omitted.

Referring to FIGS. 13, 14(a), and 14(b), in the liquid crystal display device 500, no transparent conductive film 111 is formed between a passivation layer 109 and interlayer insulation layer 112. Regarding storage capacitance, only storage capacitance Cs5 is formed between Cs wiring 224 and Cs electrodes 104a using a gate insulator 106 as a dielectric.

Therefore, to secure storage capacitance, width W5 of the Cs wiring 224 is set to be larger than the width W3 of the Cs wiring 104 according to Embodiment 3 described above. Also, transparent pixel electrodes 113 are subject to electric field disturbance due to gate voltage, lowering display characteristics near pixel boundaries. Thus, near the pixel boundaries, widths W7 and W8 of a black matrix 202a are set to be larger than the widths W1 and W2 of the black matrix 202 according to Embodiment 3. Incidentally, a width W6 of the Cs electrodes 104a is the same as the width W4 of the Cs wiring 104.

Figure 15:
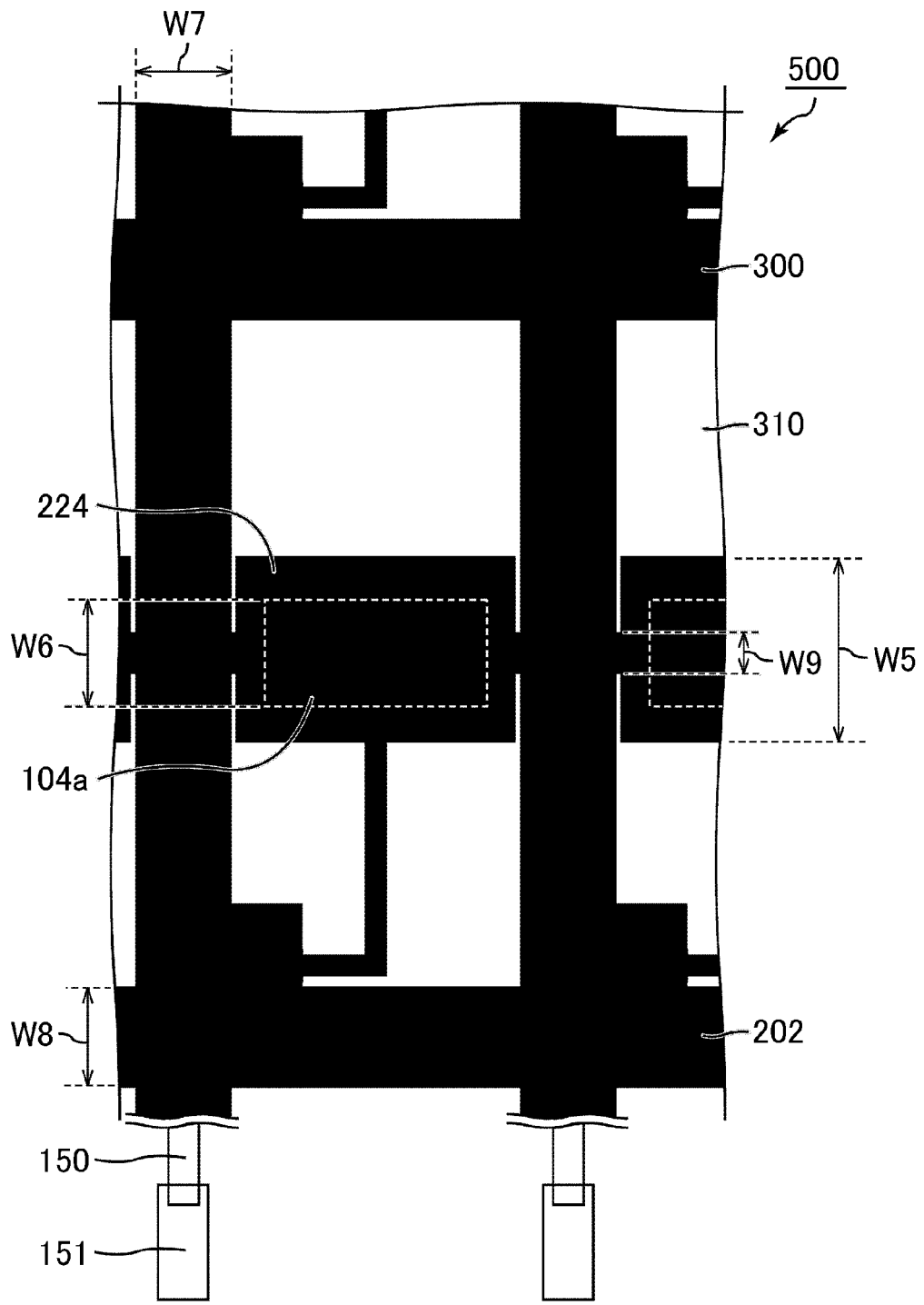
FIG. 15 is a schematic plan view showing a display area and non-display area of the pixel shown in FIG. 13.

In FIG. 15, black part corresponds to a non-display area 300 and part not marked black corresponds to a display area 310. When FIG. 15 according to the present comparative embodiment and FIG. 10 according to Embodiment 3 are compared, obviously the non-display area 300 in FIG. 15 is wider, resulting in a lower pixel aperture ratio.

The aforementioned modes of the embodiments may be employed in appropriate combination as long as the combination is not beyond the scope of the present invention.

The present application claims priority to Patent Application No. 2009-207474 filed in Japan on Sep. 8, 2009 under the Paris Convention and provisions of national law in a designated State, the entire contents of which are hereby incorporated by reference.

EXPLANATION OF SYMBOLS 100, 210, 220, 500: Liquid crystal display device
101, 201: Supporting substrate 102: Gate line
102a: Gate electrode
103: Source line
103a: Source electrode
104, 224: Cs wiring
104a, 224a: Cs electrode
105: TFT
106: Gate insulator
107: Semiconductor layer
107a, 107b: a-Si layer
108: Drain electrode
109: Passivation layer
110, 110a, 110b: TFT array substrate
111, 111a, 111b, 111c: Transparent conductive film
112: Interlayer insulation layer
113: Transparent pixel electrode
120: Liquid crystal layer
130: CF substrate
115, 118, 128: Contact hole
150: Lead wire
151: Terminal
202, 202a: Black matrix
203: CF layer
204: Opposed electrode
211a, 211b: Hole
300: Non-display area
310: Display area
W1 to W9: Width
Cs1 to Cs5: Storage capacitance
P, Q, R, S, T: Region
P1: Pixel pitch

The invention claimed is:

1. A liquid crystal display device provided with a liquid crystal layer interposed between a thin film transistor array substrate and an opposed substrate and with a plurality of pixels, wherein:
the thin film transistor array substrate comprises:
gate lines and source lines arranged in a grid pattern on a principal surface of a supporting substrate,
transparent pixel electrodes placed on the pixels,
thin film transistors formed in the vicinity of intersection points between the gate lines and source lines, and
a gate insulator, a passivation layer, a transparent conductive film, a first insulation layer, and transparent pixel electrodes stacked in order from a supporting substrate side;
the transparent pixel electrodes are electrically connected with drain electrodes of the thin film transistors through contact holes formed in the first insulation layer;
when a substrate surface is viewed in a direction of a normal to the substrate surface, the transparent conductive film does not overlap regions in which the transparent pixel electrodes and the drain electrodes are electrically connected with each other; and
the thin film transistor array substrate further comprises storage capacitor electrodes placed across the passivation layer from the transparent conductive film when the substrate surface is viewed in the direction of the normal.

2. The liquid crystal display device according to claim 1, wherein the transparent conductive film is located so as to overlap the transparent pixel electrodes via the first insulation layer.

3. The liquid crystal display device according to claim 1, wherein a pitch of the pixels is 40 μm or less.

4. The liquid crystal display device according to claim 1, wherein a potential of the transparent conductive film is constant.

5. The liquid crystal display device according to claim 1, wherein the transparent conductive film is provided with an opening only a location overlapping an area in and around an opening of the first insulation layer when the substrate surface is viewed in the direction of the normal.

6. The liquid crystal display device according to claim 1, wherein the thin film transistor array substrate further comprises storage capacitor wiring placed across the gate insulator from the transparent conductive film when the substrate surface is viewed in the direction of the normal.

7. The liquid crystal display device according to claim 1, wherein the thin film transistors include semiconductor layers which consist of an oxide semiconductor material.

8. A liquid crystal display device provided with a liquid crystal layer interposed between a thin film transistor array substrate and an opposed substrate and with a plurality of pixels, wherein:
the thin film transistor array substrate comprises:
gate lines and source lines arranged in a grid pattern on a principal surface of a supporting substrate,
transparent pixel electrodes placed on the pixels,
thin film transistors formed in the vicinity of intersection points between the gate lines and source lines, and
a gate insulator, a passivation layer, a transparent conductive film, a first insulation layer, and transparent pixel electrodes stacked in order from a supporting substrate side;
the transparent pixel electrodes are electrically connected with drain electrodes of the thin film transistors through contact holes formed in the first insulation layer;
when a substrate surface is viewed in a direction of a normal to the substrate surface, the transparent conductive film does not overlap regions in which the transparent pixel electrodes and the drain electrodes are electrically connected with each other; and
the thin film transistor array substrate further comprises storage capacitor wiring placed across the gate insulator from the transparent conductive film when the substrate surface is viewed in the direction of the normal.

9. The liquid crystal display device according to claim 8, wherein the thin film transistor array substrate further comprises storage capacitor electrodes placed across the passivation layer from the transparent conductive film when the substrate surface is viewed in the direction of the normal.

10. The liquid crystal display device according to claim 8, wherein the storage capacitor electrodes and storage capacitor wiring face each other across the gate insulator.

11. The liquid crystal display device according to claim 8, wherein the transparent conductive film is located so as to overlap the transparent pixel electrodes via the first insulation layer.

12. The liquid crystal display device according to claim 8, wherein a pitch of the pixels is 40 μm or less.

13. The liquid crystal display device according to claim 8, wherein a potential of the transparent conductive film is constant.

14. The liquid crystal display device according to claim 8, wherein the transparent conductive film is provided with an opening only a location overlapping an area in and around an opening of the first insulation layer when the substrate surface is viewed in the direction of the normal.

15. The liquid crystal display device according to claim 8, wherein the thin film transistors include semiconductor layers which consist of an oxide semiconductor material.

* * * * *